(12) United States Patent
Ihara

(10) Patent No.: US 11,845,907 B2
(45) Date of Patent: Dec. 19, 2023

(54) CARBON TRANSFER FILM

(71) Applicant: DAICEL CORPORATION, Osaka (JP)

(72) Inventor: Ryosuke Ihara, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 0 days.

(21) Appl. No.: 17/760,514

(22) PCT Filed: Sep. 16, 2020

(86) PCT No.: PCT/JP2020/035014
§ 371 (c)(1),
(2) Date: Mar. 15, 2022

(87) PCT Pub. No.: WO2021/054348
PCT Pub. Date: Mar. 25, 2021

(65) Prior Publication Data
US 2022/0356412 A1  Nov. 10, 2022

(30) Foreign Application Priority Data
Sep. 16, 2019 (JP) ................ 2019-167886

(51) Int. Cl.
*C10M 125/02* (2006.01)
*C10M 171/06* (2006.01)
*C10N 50/08* (2006.01)

(52) U.S. Cl.
CPC ........ *C10M 125/02* (2013.01); *C10M 171/06* (2013.01); *C10M 2201/041* (2013.01); *C10N 2050/08* (2013.01)

(58) Field of Classification Search
CPC .............. C10M 125/02; C10M 171/06; C10M 159/12; C10M 2203/1025;
(Continued)

(56) References Cited

U.S. PATENT DOCUMENTS 9,023,771 B2   5/2015  Mabuchi
10,766,776 B2   9/2020  Makino et al.
(Continued)

FOREIGN PATENT DOCUMENTS

JP   3936724 B1    6/2007
JP   2017-186234 A  10/2017
(Continued)

OTHER PUBLICATIONS

International Preliminary Report on Patentability and Written Opinion of the International Searching Authority for International Application No. PCT/JP2020/035014, dated Mar. 15, 2022, with English translation.
(Continued)

*Primary Examiner* — Vishal V Vasisth
(74) *Attorney, Agent, or Firm* — Birch, Stewart, Kolasch & Birch, LLP

(57) ABSTRACT

Provided is a carbon transfer film excellent in wear suppression and friction reduction effects. A carbon transfer film 12 contains $sp^2$-bonded carbon, wherein a ratio of zirconium calculated by elemental analysis of a surface by SEM-EDX measurement is 0.6 mass % or lower, and a thickness is less than 100 nm. A sliding member 1 includes a substrate 11 and a carbon transfer film 12 provided on at least one surface of the substrate 11, wherein the carbon transfer film 12 contains $sp^2$-bonded carbon and has a thickness of less than 100 nm; and a ratio of zirconium calculated from elemental analysis the carbon transfer film 12 surface by SEM-EDX measurement of is 0.6 mass % or lower. A lubricant composition contains an organic dispersion medium as a lubricant base and nanodiamond particles nanodispersed in the organic dispersion medium, wherein a content ratio of zirconia is lower than 100 mass ppm.

17 Claims, 7 Drawing Sheets

(58) Field of Classification Search
CPC .... C10M 2201/041; C10M 2207/2835; C10M 2203/065; C10M 2205/028; C10M 2203/02; C10M 2209/1033; C10M 2215/04; C10M 2215/08; C10M 2219/00; C10M 2207/04; C10M 2207/28; C10N 2050/08; C10N 2050/015; C10N 2030/06; C10N 2030/56; C10N 2010/08; C10N 2020/06; C23C 24/02; F16C 33/14; F16C 33/12; C01B 32/28
See application file for complete search history.

(56) References Cited

U.S. PATENT DOCUMENTS

| | | | |
|---|---|---|---|
| 11,167,993 | B2 | 11/2021 | Umemoto |
| 2009/0018037 | A1 | 1/2009 | Mabuchi et al. |
| 2009/0048129 | A1 | 2/2009 | Mabuchi et al. |
| 2012/0308949 | A1* | 12/2012 | Hirose .................. C23C 16/26 428/408 |
| 2020/0123012 | A1 | 4/2020 | Makino et al. |
| 2020/0189916 | A1 | 6/2020 | Umemoto |

FOREIGN PATENT DOCUMENTS

| WO | WO 2007-088649 A1 | 8/2007 |
|---|---|---|
| WO | WO 2018/235599 A1 | 12/2018 |

OTHER PUBLICATIONS

International Search Report for International Application No. PCT/JP2020/035014, dated Oct. 20, 2020, with English translation.

* cited by examiner

CARBON TRANSFER FILM

This application is a 371 of PCT/JP2020/035014 filed Sep. 16, 2020

TECHNICAL FIELD

The present disclosure relates to a carbon transfer film. The present application claims priority to JP 2019-167886 filed in Japan on Sep. 16, 2019, the contents of which are incorporated herein.

BACKGROUND ART

Currently, members provided with a sliding surface (which may be hereinafter referred to as "sliding members") are widely used as product materials in a variety of fields including automobiles, mechanical parts, medical devices, and household electrical appliances.

Surface modification technology is attracting attention as a technique to improve tribological properties of sliding members. Non-Patent Literature 1 describes that a tribofilm is formed on a SUS304 substrate by interposing graphene oxide dispersion (graphene oxide concentration: 1 mass %) between the SUS304 substrate and an ultrahard ball for bearings and sliding the friction surfaces, and this reduces a coefficient of friction.

CITATION LIST

Non-Patent Literature

Non-Patent Literature 1: "Elucidation of Friction Mechanism of Graphene Oxide Lubricating Additives", Proceedings of Tribology Conference Spring 2015, Himeji, p. 163-164

SUMMARY OF INVENTION

Technical Problem

However, Non-Patent Literature 1 describes that the tribofilm do not closely adhere to the friction surfaces and the end portion thereof is peeled off, and in fact, the tribofilm remains only on a part of the friction surfaces. Using such a sliding member causes the peeling off and elimination of the tribofilm from the end portion to proceed and leads to a problem of failing to provide satisfactory wear suppression effect and friction reduction effect.

Thus, an object of the present disclosure is to provide a carbon transfer film excellent in a wear suppression effect and a friction reduction effect. Another object of the present disclosure is to provide a sliding member provided with a sliding surface excellent in a wear suppression effect and a friction reduction effect. Yet another object of the present disclosure is to provide a lubricant composition that can impart an excellent wear suppression effect and an excellent friction reduction effect.

Solution to Problem

As a result of diligent research to achieve the above objects, the inventors of the present disclosure have found that a transfer film formed on a substrate by sliding the substrate and another member in the presence of a specific lubricant composition has a specific configuration and is excellent in a wear suppression effect and a friction reduction effect. The present invention relates to what has been completed based on these findings.

That is, the present disclosure provides a carbon transfer film containing $sp^2$-bonded carbon, in which a ratio of zirconium calculated from elemental analysis of a surface by SEM-EDX measurement is 0.6 mass % or lower, and a thickness is less than 100 nm.

The carbon transfer film preferably further contains $sp^3$-bonded carbon. The $sp^3$-bonded carbon is preferably carbon derived from diamond.

The $sp^2$-bonded carbon is preferably carbon derived from diamond.

In addition, the present disclosure provides a sliding member including:
a substrate, and
a carbon transfer film provided on at least one surface of the substrate,
in which the carbon transfer film contains $sp^2$-bonded carbon and has a thickness of less than 100 nm, and
a ratio of zirconium calculated from elemental analysis of the carbon transfer film surface by SEM-EDX measurement is 0.6 mass % or lower.

The carbon transfer film may contain a component derived from the substrate.

In addition, the present disclosure provides a lubricant composition containing an organic dispersion medium as a lubricant base and nanodiamond particles nanodispersed in the organic dispersion medium, in which a content ratio of zirconia is lower than 100 mass ppm.

The nanodiamond particles are preferably surface-modified nanodiamond particles that are surface-modified with a group represented by Formula (1):

$$—X—R^1 \tag{1}$$

where in Formula (1), X represents —NH—, —O—, —O—C(=O)—, —C(=O)—O—, —NH—C(=O)—, —C(=O)—NH—, or —S—, and the bond extending left from X is bonded to a nanodiamond particle; $R^1$ represents a monovalent organic group, and an atom bonded to X is a carbon atom; and in Formula (1), a molar ratio of carbon atoms to a total amount of heteroatoms selected from the group consisting of nitrogen atoms, oxygen atoms, sulfur atoms, and silicon atoms is 4.5 or higher.

In addition, the present disclosure provides a lubricant composition containing:
an organic dispersion medium as a lubricant base, and
surface-modified nanodiamond particles nanodispersed in the organic dispersion medium, the surface-modified nanodiamond particles being surface-modified with a group represented by Formula (1):

$$—X—R^1 \tag{1}$$

where in Formula (1), X represents —NH—, —O—, —O—C(=O)—, —C(=O)—O—, —NH—C(=O)—, —C(=O)—NH—, or —S—; a bond extending left from X is bonded to a nanodiamond particle; $R^1$ represents a monovalent organic group, and an atom bonded to X is a carbon atom; and in Formula (1), a molar ratio of carbon atoms to a total amount of heteroatoms selected from the group consisting of nitrogen atoms, oxygen atoms, sulfur atoms, and silicon atoms is 4.5 or higher.

The $R^1$ is preferably a monovalent organic group having no hydroxy group, carboxy group, amino group, mono-substituted amino group, terminal alkenyl group, or terminal epoxy group.

The organic dispersion medium as a lubricant base is preferably one or more selected from the group consisting of a polyol ester, a poly(α-olefin), a mineral oil, an alkylbenzene, and a polyalkylene glycol.

In the lubricant composition, a content ratio of the nanodiamond particles is preferably from 0.01 to 5.0 mass %, and an average dispersed particle size of the nanodiamond particles in the lubricant composition is preferably from 2 to 50 nm.

The lubricant composition preferably has a content ratio of the nanodiamond particles of 0.1 to 2000 mass ppm and an average dispersed particle size of the nanodiamond particles in the lubricant composition from 5 to 100 nm.

In addition, the present disclosure provides a method of manufacturing a sliding member including a substrate and a carbon transfer film provided on a surface of the substrate, the method including:

relatively sliding a sliding surface of the substrate and a sliding surface of a member for sliding in the presence of the lubricant composition to transfer carbon derived from the nanodiamond particles in the lubricant composition onto the substrate to form the carbon transfer film.

In the method of manufacturing a sliding member, further, a component in the substrate may be transferred onto the substrate by the sliding to form the carbon transfer film.

The member for sliding is preferably a metal material.

The sliding may be performed under boundary lubrication conditions.

In addition, the present disclosure provides a piston having the carbon transfer film in a sliding region relative to a cylinder.

Furthermore, the present disclosure provides a cylinder having the carbon transfer film in a sliding region relative to a piston.

Advantageous Effects of Invention

The carbon transfer film of the present disclosure and the sliding member of the present disclosure are excellent in a wear suppression effect and a friction reduction effect. In particular, the carbon transfer film of the present disclosure can be easily formed because of the low content ratio of zirconium, which can be a foreign substance in the carbon transfer film, and furthermore, the carbon transfer film even with a small thickness exhibits an excellent wear suppression effect and an excellent friction reduction effect. In addition, the lubricant composition of the present disclosure can impart an excellent wear suppression effect and an excellent friction reduction effect, and the excellent wear suppression effect and the excellent friction reduction effect can prevent or suppress the seizure of the sliding member.

DESCRIPTION OF EMBODIMENTS

Carbon Transfer Film

Figure 1:
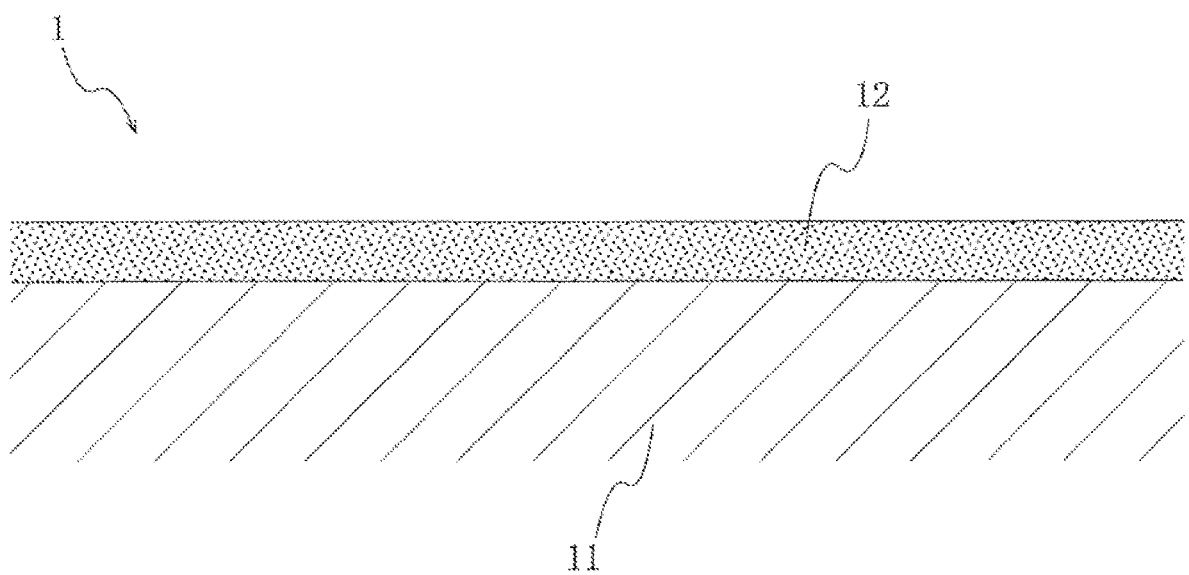
FIG. 1 is a partial cross-sectional schematic view of a sliding member according to an embodiment of the present disclosure.

A carbon transfer film of the present disclosure contains $sp^2$-bonded carbon, in which a ratio of zirconium calculated from elemental analysis of a surface by SEM-EDX measurement is 0.6 mass % or lower, and a thickness is less than 100 nm. In the present specification, the carbon transfer film may be referred to as the "carbon transfer film (X)".

In the present specification, the "surface" refers to a surface that is a sliding surface in a movable part of a sliding member during sliding. In addition, in the present specification, the "carbon transfer film" is a concept including: a film formed by adhesion of wear powder (also referred to as transfer particles) generated from at least one of two relatively sliding members to a surface of the other member; and a film formed by adsorption of an additive and wear powder contained in a lubricant to a sliding surface, or by a chemical reaction (what is called a tribofilm). That is, the carbon transfer film (X) is composed of a film formed from the wear powder containing carbon and/or the tribofilm containing carbon.

The carbon transfer film (X) contains $sp^2$-bonded carbon. That is, the carbon transfer film (X) contains $sp^2$-bonded carbon corresponding to the diamond structure. In addition, the carbon transfer film (X) may further contain $sp^3$-bonded carbon. In this case, the carbon transfer film (X) contains $sp^2$-bonded carbon corresponding to the graphite structure and $sp^3$-bonded carbon corresponding to the diamond structure in a mixed manner.

In the carbon transfer film (X) containing $sp^3$-bonded carbon and $sp^2$-bonded carbon, a ratio of the $sp^3$-bonded carbons to a sum of the $sp^2$-bonded carbons and the $sp^3$-bonded carbons, $sp^3/(sp^2+sp^3)$, in the carbon transfer film (X) is not particularly limited but is preferably 0.2 or lower, more preferably 0.1 or lower, and even more preferably lower than 0.1. With the ratio of 0.2 or lower, the carbon transfer film has even better low wear properties. In addition, the ratio is a value higher than 0, for example, 0.01 or higher.

The ratio $sp^3/(sp^2+sp^3)$ can be evaluated using a Raman spectrum obtained by Raman spectroscopic analysis. For evaluating a carbon material using a Raman spectrum, the ratio is determined by regarding a peak corresponding to the diamond structure as the $sp^3$-bonded carbon, and two peaks, a disorder (D) band and a graphite (G) band, corresponding to the graphite structure as the $sp^2$-bonded carbon, and using a ratio of intensities of these peaks or the like as an index.

That is, the ratio $sp^3/(sp^2+sp^3)$ can be determined by using a ratio of an area intensity (I) of a peak corresponding to the diamond structure, the peak observed in a range of 1320 to 1330 $cm^{-1}$ of a Raman spectrum obtained by Raman spectroscopic analysis, to a sum of the area intensity (I) of the peak corresponding to the diamond structure, a peak area intensity (Id) of D band observed in a range of 1300 to 1400 $cm^{-1}$ (which may be hereinafter referred to as the "D peak"), and a peak area intensity (Ig) of G band observed in a range of 1570 to 1640 $cm^{-1}$ (which may be hereinafter referred to as the "G peak"), I/(Id+Ig+I), as an index. This is because the ratio $sp^3/(sp^2+sp^3)$ and the ratio I/(Id+Ig+I) are probably correlated values.

The Raman spectrum can be measured, for example, under the following conditions.

Measuring instrument: microlaser Raman spectrometer, trade name "LabRAM HR Evolution" (available from Horiba, Ltd.)
Measurement light source: 325 nm
Output: 1.075 mW
Exposure time: from 4 to 16 seconds
Cumulative number of scans: from 2 to 4 times When the carbon transfer film (X) contains $sp^3$-bonded carbon and $sp^2$-bonded carbon, the carbon transfer film (X) preferably has the G band observed in a range of 1570 to 1640 $cm^{-1}$ and the D band observed in a range from 1300 to 1400 $cm^{-1}$ in a Raman spectrum obtained by Raman spectroscopic analysis using the measurement light source of 325 nm. The G band more preferably ranges from 1580 to 1640 $cm^{-1}$, even more preferably from 1590 to 1630 $cm^{-1}$, and particularly preferably from 1600 to 1620 $cm^{-1}$.

In general, nanodiamond is known to exhibit peaks originating from $sp^3$-bonded carbon and $sp^2$-bonded carbon in a Raman spectrum. However, the peak intensity originating from $sp^3$-bonded carbon and the peak intensity of the G band of the carbon transfer film (X) are clearly different from the peak intensity of the known nanodiamond.

For the carbon transfer film (X) having the peak originating from $sp^3$-bonded carbon, the D peak, and the G peak in the Raman spectrum described above, the peak intensity of the G band of the carbon transfer film (X) is preferably greater than the peak intensity of the peak originating from the $sp^3$-bonded carbon. In addition, the peak intensity of the G band of the carbon transfer film (X) is preferably greater than the peak intensity of the D band. That is, in the Raman spectrum of the carbon transfer film (X), the slope (gradient) of the baseline is preferably rising to the right. This means that while diamond-like carbons (DLCs) are known as carbon-based substances exhibiting a gradient rising to the right in a Raman spectrum, the waveform of the Raman spectrum of the carbon transfer film (X) is close to that of graphite-like carbons (GLCs) among DLCs. Although the exact mechanism is unknown, for the carbon transfer film (X), the carbon transfer film exhibiting the DLC-like Raman spectrum waveform is presumably formed from carbon derived from diamond (nanodiamond). In addition, this presumably has some effect on the development of the friction reduction effect and the wear suppression effect.

A ratio of zirconium calculated from elemental analysis of the carbon transfer film (X) surface by SEM-EDX measurement is 0.6 mass % or lower, preferably 0.3 mass % or lower, more preferably 0.1 mass % or lower, particularly preferably 500 mass ppm or lower, and most preferably zirconium is not contained. With the ratio of zirconium of 0.6 mass % or lower, the content ratio of zirconium, which can be a foreign substance in the carbon transfer film, is low, and thus this provides excellent formability of the carbon transfer film and the carbon transfera film can be easily formed. Furthermore, because of the low content ratio of zirconium, which can be a foreign substance in the carbon transfer film, even a thin film exhibits an excellent wear suppression effect and an excellent friction reduction effect.

The SEM-EDX measurement is performed on the carbon transfer film (X) surface in a state where the carbon transfer film (X) is formed on a support, such as a substrate. Specifically, the carbon transfer film (X) formed on a support is irradiated with an electron beam from the carbon transfer film (X) surface side, characteristic X-rays generated by the electron beam irradiation are detected and spectroscopically separated by energy, and elemental analysis and composition analysis are performed. When a component of the support is detected and included in the analytical result, the component of the support is difficult to distinguish from the components of the carbon transfer film in the analysis result, and thus the ratio of zirconium is calculated from the composition analysis result including the component of the support.

The SEM-EDX measurement can be measured, for example, under the following conditions.

Measuring instrument: scanning electron microscope, trade name "SU5000" (available from Hitachi High-Technologies Corporation); energy-dispersive X-ray spectroscopy instrument, trade name "X-Max 50" (available from OXFORD instruments)
Accelerating voltage: 5 kV The carbon transfer film (X) contains at least carbon as a constituting atom and may contain an additional atom, such as iron, oxygen, chromium, nickel, or silicon.

The thickness of the carbon transfer film (X) (film thickness) is less than 100 nm. With the film thickness of less than 100 nm, the carbon transfer film (X) even with a small thickness exhibits an excellent wear suppression effect and an excellent friction reduction effect. The thickness may be, for example, 3 nm or greater, 5 nm or greater, or 10 nm or greater.

A coefficient of friction of the surface of the carbon transfer film (X) is preferably low from the viewpoints of the friction reduction effect and the wear suppression effect and is, for example, 0.2 or less, preferably 0.17 or less, and more preferably 0.16 or less. With the coefficient of friction of 0.2 or less, further low friction effect is obtained.

The method of measuring the coefficient of friction is not particularly limited and can be appropriately selected according to the purpose or application of the carbon transfer film from methods, such as a ball (pin)-on-disk rotational test, a ball (pin)-on-disk reciprocating test, a thrust cylinder test, a block-on-ring test, a four-ball test, a pin-block test, and a vibration friction wear test.

For example, the coefficient of friction of the surface of the carbon transfer film (X) may be determined by a friction test using the following dripping, ball-on-disk type sliding friction tester.

Friction test: A ball-on-disk type SRV friction tester equipped with an SUJ2 disc, an SUJ2 ball with a diameter of 10 mm on which a carbon transfer film is formed, and a load cell is used to measure friction force between the disc and the ball with the load cell when the ball is reciprocally slid against the sliding surface of the disc under conditions of an initial load of 100 N, an amplitude of 1.5 mm, a frequency of 50 Hz, and a time of 20 minutes, and the coefficient of friction is calculated by dividing the friction force by the load described above.

The carbon transfer film (X) is excellent in a wear suppression effect and a friction reduction effect. In particular, the carbon transfer film (X) can be easily formed because of the low content ratio of zirconium, which can be a foreign substance in the carbon transfer film, and furthermore, the carbon transfer film (X) even with a small thickness exhibits an excellent wear suppression effect and an excellent friction reduction effect. Moreover, the excellent wear suppression effect and the excellent friction reduction effect can prevent or suppress the seizure of the sliding member.

Sliding Member

The present disclosure provides a sliding member including:

a substrate, and a carbon transfer film provided on at least one surface of the substrate, in which the carbon transfer film contains $sp^2$-bonded carbon and has a thickness of less than 100 nm, and a ratio of zirconium calculated from elemental analysis of the carbon transfer film surface by SEM-EDX measurement is 0.6 mass % or lower. The sliding member can be obtained, for example, by forming the carbon transfer film (X) on a substrate. The sliding member may have a layer other than the substrate and the carbon transfer film.

FIG. 1 is a cross-sectional schematic view illustrating an embodiment of the sliding member of the present disclosure. As illustrated in FIG. 1, a sliding member 1 is provided with a substrate 11 and a carbon transfer film 12 provided on a surface of the substrate 11. The sliding member 1 is provided with the carbon transfer film 12 on the entire surface of the substrate 11. The sliding member 1 has the carbon transfer film 12 at least in the region serving as the sliding region on the substrate 11 and may have a region having no carbon transfer film 12.

The substrate is any substrate for forming the carbon transfer film thereon to reduce the coefficient of friction of the sliding member surface and is not particularly limited. Examples of the material constituting the substrate include known or commonly used materials used for sliding members and include, for example, metals, such as iron, copper, aluminum, and titanium; carbon; silicon; and various resins. The substrate may be composed of one material or may be composed of two materials.

Examples of the substrate include metal materials, such as alloy steel (such as carbon steel, chromium steel, and chromium molybdenum steel) and steel for special applications (such as alloy tool steel, stainless steel (e.g., SUS), bearing steel (e.g., SUJ), and spring steel (e.g., SUP)); copper plates; aluminum plates; titanium plates; silicon substrates; and carbon films, such as diamond-like carbon (DLC) films. The substrate surface may be subjected to a surface treatment of various types including an electrochemical treatment of various types, such as plating, a chemical conversion treatment, or anodic oxidation; coating of various types, such as flowable coating or powder coating; or a physical surface treatment, such as shot blasting.

The carbon transfer film in the sliding member contains $sp^2$-bonded carbon derived from diamond. The carbon transfer film may contain a component derived from the substrate (e.g., iron, carbon, or silicon).

A ratio of zirconium calculated from elemental analysis of the carbon transfer film surface by SEM-EDX measurement is 0.6 mass % or lower, preferably 0.3 mass % or lower, more preferably 0.1 mass % or lower, particularly preferably 500 mass ppm or lower, and most preferably zirconium is not contained. The ratio of zirconium of 0.6 mass % or lower indicates that the content ratio of zirconium, which can be a foreign substance in the carbon transfer film, is low, and this provides excellent formability of the carbon transfer film and the carbon transfer film can be easily formed. Furthermore, because of the low content ratio of zirconium, which can be a foreign substance in the carbon transfer film, even a thin film exhibits an excellent wear suppression effect and an excellent friction reduction effect. The specific method and conditions of the SEM-EDX measurement are the same as those described for the carbon transfer film (X) described above.

The carbon transfer film is preferably the carbon transfer film (X). In addition, a preferred aspect of the carbon transfer film in the sliding member is the same as the preferred aspect of the carbon transfer film (X).

The sliding member is excellent in a friction reduction effect and a wear suppression effect and thus can be preferably utilized as a product material in a variety of fields including automobiles, mechanical parts, medical devices, and household electrical appliances.

Examples of the sliding member include cylinders and pistons. The cylinder has the carbon transfer film (e.g., carbon transfer film (X)), for example, in the sliding region relative to the piston. In addition, the piston has the carbon transfer film (e.g., carbon transfer film (X)), for example, in the sliding region relative to the piston. Such a cylinder and/or a cylinder has the carbon transfer film in the sliding region relative to each other, and thus this reduces friction and wear despite repeated sliding and suppresses the seizure of the sliding portion.

The sliding member is provided with the carbon transfer film, and the carbon transfer film serves as the sliding surface, and thus the sliding member is excellent in a wear suppression effect and a friction reduction effect and can prevent or suppress the seizure of the sliding member.

Lubricant Composition

The present disclosure provides a lubricant composition containing:

an organic dispersion medium as a lubricant base, and nanodiamond particles nanodispersed in the organic dispersion medium, in which a content ratio of zirconia is lower than 100 mass ppm. In the present specification, the lubricant composition may be referred to as the "lubricant composition (A)". The present disclosure also provides a lubricant composition containing:

an organic dispersion medium as a lubricant base, and surface-modified nanodiamond particles nanodispersed in the organic dispersion medium, the surface-modified nanodiamond particles being surface-modified with a group represented by Formula (1) described later. In the present specification, the lubricant composition may be referred to as the "lubricant composition (B)". In addition, the lubricant composition (A) and the lubricant composition (B) may be collectively referred to as the "lubricant composition (Y)". Using the lubricant composition (A) enables the carbon transfer film (X) and the sliding member to be manufactured. Hereinafter, "nanodiamond" may be referred to as "ND".

The lubricant composition may be a lubricant composition for initial running-in or may be a lubricant composition for main lubrication. In the present specification, the lubricant composition for initial running-in refers to those used to form a low friction surface (running-in surface) at an initial stage of a machine having a sliding member. With the lubricant composition for initial running-in, for example, the sliding member surface can be smoothed by flattening recesses and protrusions on the surface, or a modified surface can be formed. After formation of the running-in surface, the lubricant composition for initial running-in is removed by washing or the like, and sliding using a lubricant composition for performing main lubrication (lubricant composition for main lubrication) is implemented. Here, the lubricant composition for main lubrication refers to a lubricant commonly not removed and continuously present on the sliding portion during operation of the sliding member (during use of the machine). The lubricant composition for initial running-in can also be used as a lubricant composition for performing main lubrication by using the composition as is without removing it after formation of the running-in surface or by removing the composition after formation of the running-in surface and then supplying the composition again to the sliding portion.

As shown by the Stribeck curve, the coefficient of friction of the sliding portion when a lubricant is used varies across a fluid lubrication region, a mixed lubrication region, and a boundary lubrication region depending on the viscosity of the lubricant, the sliding speed, and the load. In the fluid lubrication region, the sliding members are separated by a continuous lubricant film, and the distance between the sliding members is much larger than the surface roughness of the sliding members. Thus, the frictional resistance in the fluid lubrication region is mainly due to the internal friction of the lubricant. From the fluid lubrication region, the lubricant film becomes thinner owing to load increase, a decrease in sliding speed, or an increase in temperature, and along with these changes, the coefficient of friction increases rapidly and varies from the fluid lubrication region to the mixed lubrication region and then to the boundary lubrication region. In the boundary lubrication region, the frequency of solid contact between the members increases, and the portion supported by the lubricant film is extremely small. Thus, in the boundary lubrication region, mainly, the physical properties of the surface of the sliding member have a greater effect on the frictional resistance than physical properties, such as the wear resistance, of the lubricant. On the other hand, the lubricant composition (Y) reduces the coefficient of friction in the boundary lubrication region, and this can also widen the mixed lubrication region and the fluid lubrication region.

In the lubricant composition (Y), ND particles are nanodispersed in the organic dispersion medium as a lubricating base. Most of lubricant compositions used as a lubricant for a sliding portion are oil-based, and thus using an organic dispersion medium as a lubricant base enables the carbon transfer film (X) to be applied to a wide range of applications.

Examples of the organic dispersion medium as a lubricant base include polyphenyl ethers, alkylbenzenes, alkylnaphthalenes, ester oils, glycol-based synthetic oils, polyolefin-based synthetic oils, and mineral oils. More specifically, examples thereof include poly(α-olefin)s, ethylene-α-olefin copolymers, polybutenes, alkylbenzenes, alkylnaphthalenes, polyalkylene glycols, alkyl-substituted diphenyl ethers, polyol esters, dibasic esters, carbonate esters, phosphate esters, silicone oils, fluorinated oils, gas-to-liquids (GTL), and mineral oils. Only one, or two or more of the organic dispersion mediums as a lubricant base may be used.

Among these, the organic dispersion medium as a lubricant base is preferably a polyol ester, a poly(α-olefin), a mineral oil, an alkylbenzene, or a polyalkylene glycol from the viewpoint of an even better effect of reducing the wear amount of the sliding member.

The lubricant composition (A) has a content ratio of zirconia of lower than 100 mass ppm, preferably 20 mass ppm or lower, and more preferably 2 mass ppm or lower. With the content ratio of zirconia of lower than 100 mass ppm, the lubricant composition (A) has excellent formability of the carbon transfer film (X) and can easily form a carbon transfer film on a substrate. In addition, this prevents mixing of zirconium into the carbon transfer film (X) and allows even a thin film to exhibit an excellent wear suppression effect and an excellent friction reduction effect. The lower limit of the content ratio of zirconia may be, for example, 0.02 mass ppm or 0.1 mass ppm.

The content ratio of zirconia can be determined based on a detected amount of Zr on the basis of the dispersion liquid with a known content ratio, in which Zr is detected by high-frequency inductively coupled plasma emission spectroscopy (ICP emission spectroscopy). Zirconia, which is derived from zirconia beads contained in a bead mill used to disintegrate agglutinated ND particles and nanodisperse the ND particles, often mixes into a lubricant composition. Thus, a lubricant composition with a low content ratio of zirconia can be obtained by not performing bead milling using zirconia beads or by minimizing the time for performing the bead milling.

The ND particles contained in the lubricant composition are not particularly limited, and known or commonly used nanodiamond particles can be used. The ND particles may be ND particles surface-modified (a surface-modified ND particle) or may be ND particles not surface-modified. The ND particle not surface-modified has a hydroxyl group (—OH) on the surface. Only one type, or two or more types of ND particles may be used.

Examples of a compound or a functional group for surface-modifying the ND particle in the surface-modified ND include silane compounds, a carboxyl group (—COOH), a phosphonate ion or phosphonic acid residue, surface-modifying groups having a vinyl group at the terminal, an amide group, cations of cationic surfactants, groups containing a polyglycerin chain, groups containing a polyethylene glycol chain, and other organic groups.

The ND particles contained in the lubricant composition (A) are, among others, preferably surface-modified ND particles that are surface-modified with a group represented by Formula (1) below. In addition, the ND particles contained in the lubricant composition (B) are surface-modified ND particles that are surface-modified with a group represented by Formula (1):

—X—R¹            (1)

where in Formula (1), X represents —NH—, —O—, —O—C(═O)—, —C(═O)—O—, —NH—C(═O)—, —C(═O)—NH—, or —S—; a bond extending left from X is bonded to a nanodiamond particle; $R^1$ represents a monovalent organic group, and an atom bonded to X is a carbon atom; and in Formula (1), a molar ratio of carbon atoms to a total amount of heteroatoms selected from the group consisting of nitrogen atoms, oxygen atoms, sulfur atoms, and silicon atoms is 4.5 or higher.

The surface-modified ND surface-modified with a group represented by Formula (1) above can be manufactured by reducing the amount of zirconia to be used, thus this can minimize the mixing of zirconia into the lubricant composition (Y), and the surface-modified ND has even better dispersibility in the organic dispersion medium as a lubricant base. In addition, this provides an even better friction reduction effect to the resulting carbon transfer film and sliding member.

In Formula (1) above, X represents —NH—, —O—, —O—C(═O)—, —C(═O)—O—, —NH—C(═O)—, —C(═O)—NH—, or —S—, and a bond extending left from X is bonded to a nanodiamond particle. In each of these listed bonds, the bond extending left is bonded to a nanodiamond particle, and the bond extending right is bonded to $R^1$.

In Formula (1) above, $R^1$ represents a monovalent organic group, and an atom bonded to X is a carbon atom. The monovalent organic group as $R^1$ preferably has no hydroxy group, carboxy group, amino group, mono-substituted amino group, terminal alkenyl group, or terminal epoxy group. In the present specification, the "terminal" in the terminal alkenyl group and the terminal epoxy group includes both a terminal of a main chain and a terminal of a branched chain. In addition, the monovalent organic group as $R^1$ preferably has no functional group containing active hydrogen (such as a hydroxy group, a carboxy group, an amino group, a mono-substituted amino group, a thiol group, and a phosphate group). In the present specification, the amino group referred to simply as "amino group" refers to "—$NH_2$", and the "mono-substituted amino group" refers to "—NHR" (R represents a monovalent organic group).

Examples of the monovalent organic group of the $R^1$ include a substituted or unsubstituted hydrocarbon group (a monovalent hydrocarbon group), a substituted or unsubstituted heterocyclic group (a monovalent heterocyclic group), and a group in which two or more of the monovalent hydrocarbon group above and/or the monovalent heterocyclic group above are bonded. The bonded groups may be directly bonded or may be bonded via a linking group. Examples of the linking group include an amino group, an ether bond, an ester bond, a phosphinic acid group, a sulfide bond, a carbonyl group, an organic group-substituted amide group, an organic group-substituted urethane bond, an organic group-substituted imide bond, a thiocarbonyl group, a siloxane bond, and a group in which two or more of those listed above are bonded.

Examples of the hydrocarbon group of the monovalent organic group include, for example, an aliphatic hydrocarbon group, an alicyclic hydrocarbon group, an aromatic hydrocarbon group, and a group in which two or more of those listed above are bonded.

Examples of the aliphatic hydrocarbon group include an alkyl group, an alkenyl group, and an alkynyl group. Examples of the alkyl group include a $C_{1-22}$ alkyl group, such as a methyl group, an ethyl group, a propyl group, an isopropyl group, a butyl group, a hexyl group, an octyl group, an isooctyl group, a decyl group, and a dodecyl group (preferably a $C_{2-20}$ alkyl group, and more preferably a $C_{3-18}$ alkyl group). Examples of the alkenyl group include a $C_{2-22}$ alkenyl group, such as a vinyl group, an allyl group, a methallyl group, a 1-propenyl group, an isopropenyl group, a 1-butenyl group, a 2-butenyl group, a 3-butenyl group, a 1-pentenyl group, a 2-pentenyl group, a 3-pentenyl group, a 4-pentenyl group, and a 5-hexenyl group (preferably a $C_{4-20}$ alkenyl group, and more preferably a $C_{8-18}$ alkenyl group). Examples of the alkynyl group include a $C_{2-22}$ alkynyl group, such as an ethynyl group and a propynyl group (preferably a $C_{4-20}$ alkynyl group, and more preferably a $C_{8-18}$ alkynyl group).

Examples of the alicyclic hydrocarbon group include a $C_{3-12}$ cycloalkyl group, such as a cyclopropyl group, a cyclobutyl group, a cyclopentyl group, a cyclohexyl group, and a cyclododecyl group; a $C_{3-12}$ cycloalkenyl group, such as a cyclohexenyl group; and a $C_{4-15}$ crosslinked cyclic hydrocarbon group, such as a bicycloheptanyl group and a bicycloheptenyl group.

Examples of the aromatic hydrocarbon group include a $C_{6-14}$ aryl group, such as a phenyl group and a naphthyl group (especially, a $C_{6-10}$ aryl group).

Examples of the heterocycle forming the above heterocyclic group include an aromatic heterocycle and a nonaromatic heterocycle. Examples of such a heterocycle include a 3 to 10-membered ring (preferably a 4 to 6-membered ring) having a carbon atom and at least one heteroatom (e.g., oxygen atom, sulfur atom, and nitrogen atom) as atoms constituting the ring, and a condensed ring thereof. Specific examples thereof include a heterocycle containing an oxygen atom as a heteroatom (e.g., a 3-membered ring, such as an oxirane ring; a 4-membered ring, such as an oxetane ring; a 5-membered ring, such as a furan ring, a tetrahydrofuran ring, an oxazole ring, an isoxazole ring, and a γ-butyrolactone ring; a 6-membered ring, such as a 4-oxo-4H-pyran ring, a tetrahydropyran ring, and a morpholine ring; a condensed ring, such as a benzofuran ring, an isobenzofuran ring, a 4-oxo-4H-chromene ring, a chroman ring, and an isochroman ring; and a crosslinked ring, such as a 3-oxatricyclo[4.3.1.1$^{4.8}$]undecan-2-one ring and a 3-oxatricyclo[4.2.1.0$^{4.8}$]nonan-2-one ring), a heterocycle containing a sulfur atom as a heteroatom (e.g., a 5-membered ring, such as a thiophene ring, a thiazole ring, an isothiazole ring, and a thiadiazole ring; a 6-membered ring, such as a 4-oxo-4H-thiopyran ring; and a condensed ring, such as a benzothiophene ring), and a heterocycle containing a nitrogen atom as a heteroatom (e.g., a 5-membered ring, such as a pyrrole ring, a pyrrolidine ring, a pyrazole ring, an imidazole ring, and a triazole ring; a 6-membered ring, such as an isocyanuric ring, a pyridine ring, a pyridazine ring, a pyrimidine ring, a pyrazine ring, a piperidine ring, and a piperazine ring; and a condensed ring, such as an indole ring, an indoline ring, a quinoline ring, an acridine ring, a naphthyridine ring, a quinazoline ring, and a purine ring).

Furthermore, examples of the group in which an aliphatic hydrocarbon group and an alicyclic hydrocarbon group are bonded include a cyclohexylmethyl group and a methylcyclohexyl group. Examples of the group in which an aliphatic hydrocarbon group and an aromatic hydrocarbon group are bonded include a $C_{7-18}$ aralkyl group (especially, a $C_{7-10}$ aralkyl group), such as a benzyl group and a phenethyl group; a $C_{6-10}$ aryl-$C_{2-6}$ alkenyl group, such as a cinnamyl group; a $C_{1-4}$ alkyl-substituted aryl group, such as a tolyl group; and a $C_{2-4}$ alkenyl-substituted aryl group, such as a styryl group.

Examples of the group in which two or more of the monovalent hydrocarbon group and/or the monovalent heterocyclic group are bonded via a linking group include a group in which the monovalent hydrocarbon group and/or the monovalent heterocyclic group is bonded to an alkoxy group, an alkenyloxy group, an alkynyloxy group, an aryloxy group, an aralkyloxy group, an acyloxy group, an alkylthio group, an alkenylthio group, an arylthio group, an aralkylthio group, an acyl group, an alkenylcarbonyl group, an arylcarbonyl group, an aralkylcarbonyl group, an alkyloxycarbonyl group, an alkenyloxycarbonyl group, an aryloxycarbonyl group, an aralkyloxycarbonyl group, a dialkylamino group, an acylamino group, an oxetanyl group-containing group, or a carbamoyl group; or a group in which the monovalent hydrocarbon group and/or the monovalent heterocyclic group is bonded to two or more of the groups listed above.

The hydrocarbon group of the monovalent organic group may have a substituent. Examples of the substituent include a halogen atom, such as a fluorine atom, a chlorine atom, a bromine atom, and an iodine atom; a cyano group; an isocyanate group; and an isothiocyanate group.

$R^1$ preferably contains a hydrocarbon group having 4 or more continuous carbon atoms in a linear chain. Examples of such a hydrocarbon group include a linear alkylene group, such as a tetramethylene group, a pentamethylene group, a hexamethylene group, a heptamethylene group, an octamethylene group, a nonamethylene group, and a decamethylene group; a branched alkylene group, such as a 2-ethylhexamethylene group; a linear alkenylene group, such as a 1-butenylene group, a 2-butenylene group, a 1-pentenylene group, a 2-pentenylene group, and a 3-pentenylene group; a branched alkenylene group, such as a 2-methyl-2-bute-nylene group; an alicyclic hydrocarbon group having 4 or more carbons, such as a cyclohexyl group; an aromatic hydrocarbon group having 6 or more carbons, such as a phenyl group; and a heterocyclic group containing a structure having 4 or more continuous carbon atoms, such as a piperidine ring.

In Formula (1), a molar ratio of carbon atoms to a total amount of heteroatoms selected from the group consisting of nitrogen atoms, oxygen atoms, sulfur atoms, and silicon atoms is 4.5 or higher, preferably 5 or higher, and more preferably 5.5 or higher. With the molar ratio of 4.5 or higher, the surface-modified ND particles have excellent dispersibility in the organic dispersion medium as a lubricant base. The molar ratio is not particularly limited but may be, for example, 22 or lower, or 20 or lower.

The group represented by Formula (1) has preferably from 6 to 22 carbon atoms and more preferably from 8 to 20 carbon atoms. The group represented by Formula (1) having 6 or more carbon atoms provides sufficient steric hindrance between the surface-modifying groups and facilitates dispersion of the resulting surface-modified ND particles in the dispersion medium. The group represented by Formula (1) having 22 or less carbon atoms suppresses entanglement between the surface-modifying groups and facilitates dispersion of the resulting surface-modified ND particles in the dispersion medium.

Among these, the monovalent organic group is preferably a monovalent substituted or unsubstituted hydrocarbon group, a group in which a monovalent substituted or unsubstituted hydrocarbon group and an alkoxy group are bonded, and a group in which a monovalent substituted or unsubstituted hydrocarbon group and a dialkylamino group are bonded.

In particular, in Formula (1) above, X is preferably —O—, —O—C(=O)—, —C(=O)—O—, or —NH—. When X is —O—, —O—C(=O)—, or —C(=O)—O—, $R^1$ is preferably a monovalent substituted or unsubstituted hydrocarbon group (in particular, a monovalent substituted or unsubstituted hydrocarbon group having no hydroxy group, carboxy group, amino group, mono-substituted amino group, terminal alkenyl group, or terminal epoxy group) and more preferably a linear or branched hydrocarbon group having from 8 to 20 carbons (in particular, a linear or branched hydrocarbon group having from 8 to 20 carbons and having no terminal alkenyl group).

When X is —NH—, $R^1$ is preferably a monovalent organic group containing from 8 to 20 carbon atoms (in particular, a monovalent organic group containing from 8 to 20 carbon atoms and having no hydroxy group, carboxy group, amino group, mono-substituted amino group, terminal alkenyl group, or terminal epoxy group). When X is —NH—, $R^1$ is preferably a monovalent organic group containing a hydrocarbon group having 4 or more continuous carbon atoms in a linear chain (in particular, a monovalent organic group containing a hydrocarbon group having 4 or more continuous carbon atoms in a linear chain and having no hydroxy group, carboxy group, amino group, mono-substituted amino group, terminal alkenyl group, or terminal epoxy group).

The ND particles constituting the surface-modified NDs preferably contain primary particles of nanodiamond. In addition, the ND particles may contain secondary particles in which a few to several tens of the primary particles aggregate (agglutinate). Furthermore, the surface of the surface-modified ND may have one or two or more of other surface functional groups (e.g., an amino group, a hydroxy group, or a carboxy group) in addition to a group represented by Formula (1) above.

A mass ratio of the ND to a group represented by Formula (1) above [ND/the surface-modifying group] in the surface-modified ND is not particularly limited but is preferably 0.5 or higher and more preferably 2.5 or higher. In addition, the mass ratio is preferably 15.0 or lower, more preferably 10.0 or lower, even more preferably 7.0 or lower, and particularly preferably 5.0 or lower. With the mass ratio of 0.5 or higher, the surface-modified ND is less likely to impair properties as a nanodiamond material. With the mass ratio of 15.0 or lower (in particular, 7.0 or lower), a group represented by Formula (1) above is modified to a sufficient degree and provides even better dispersibility in the organic dispersion medium as a lubricant base. The mass ratio is determined based on the weight loss rate from 200° C. to 450° C. measured by thermogravimetric analysis using the weight loss as the mass of a group represented by Formula (1) above.

The surface-modified ND can be manufactured by a method of manufacturing including reacting ND particles having a hydroxy group or a carboxy group on the surface with a compound represented by Formula (2) below in the presence of an acid catalyst in a state where the ND particles are nanodispersed in water to obtain surface-modified ND particles (which may be hereinafter referred to as the "reaction"):

$$R^2\text{—Y—H} \qquad (2)$$

where in Formula (2), Y represents —NH—, —O—, —C(=O)—O—, —C(=O)—NH—, or —S—; and $R^2$ represents a monovalent organic group, and an atom bonded to Y is a carbon atom.

In the reaction, surface-modified ND particles are obtained by reacting ND particles having a hydroxy group and/or a carboxy group on the surface with a compound represented by Formula (2) above in a state where the ND particles are nanodispersed in water to dehydrate and condense the hydroxy group and/or the carboxy group in the ND particles with the —H in the compound represented by Formula (2) above.

The ND particles are not particularly limited, and known or commonly used nanodiamond particles can be used. The ND particle has a carboxy group or a hydroxy group inherently produced in the manufacturing process. Only one type, or two or more types of ND particles may be used.

For the ND particle, for example, detonation ND (i.e., ND produced by a detonation method) and high temperature-high pressure ND (i.e., ND produced by a high temperature-high pressure method) can be used. Among them, detonation ND is preferred in that dispersibility in the dispersion medium is even better, that is, in that primary particles have a particle size of a single-digit nanometer.

The detonation ND includes air-cooled detonation ND (i.e., ND produced by an air-cooling detonation method) and water-cooled detonation ND (i.e., ND produced by a water-cooling detonation method). Among them, the air-cooled detonation ND is preferred in that primary particles are smaller compared to those of the water-cooled detonation ND.

The detonation may be performed in an air atmosphere, or may be performed in an inert gas atmosphere, such as a nitrogen atmosphere, an argon atmosphere, or a carbon dioxide atmosphere.

Examples of the compound represented by Formula (2) above specifically include primary amines, alcohols, carboxylic acids, amide compounds, and thiols. Only one, or two or more of the compounds represented by Formula (2) above may be used.

In Formula (2) above, Y represents —NH—, —O—, —O—C(=O)—, —NH—C(=O)—, or —S—. Y is selected also in view of whether Y is reacted with either of the hydroxy group or the carboxy group in the ND particle. In each of these listed bonds, the bond extending left is bonded to $R^2$, and the bond extending right is bonded to a hydrogen atom.

In particular, when the ND particle has a hydroxy group, Y is preferably —NH—, —O—, —C(=O)—O—, —C(=O)—NH—, or —S—. In addition, when the ND particle has a carboxy group, Y is preferably —O—.

In Formula (2) above, $R^2$ represents a monovalent organic group, and an atom bonded to Y is a carbon atom. Examples of the monovalent organic group in the $R^2$ include a substituted or unsubstituted hydrocarbon group (monovalent hydrocarbon group), a substituted or unsubstituted heterocyclic group (monovalent heterocyclic group), and a group in which two or more of the monovalent hydrocarbon group and/or the monovalent heterocyclic group are bonded. The bonded groups may be directly bonded or may be bonded via a linking group. Examples of the linking group include an amino group, an ether bond, an ester bond, a phosphinic acid group, a sulfide bond, a carbonyl group, an amide group, a urethane bond, an imide bond, a thiocarbonyl group, a siloxane bond, and a group in which two or more of those listed above are bonded.

Examples of the hydrocarbon group of the monovalent organic group include, for example, an aliphatic hydrocarbon group, an alicyclic hydrocarbon group, an aromatic hydrocarbon group, and a group in which two or more of those listed above are bonded.

Examples of the aliphatic hydrocarbon group include an alkyl group, an alkenyl group, and an alkynyl group. Examples of the alkyl group include a $C_{1-22}$ alkyl group, such as a methyl group, an ethyl group, a propyl group, an isopropyl group, a butyl group, a hexyl group, an octyl group, an isooctyl group, a decyl group, and a dodecyl group (preferably a $C_{2-20}$ alkyl group, and more preferably a $C_{3-18}$ alkyl group). Examples of the alkenyl group include a $C_{2-22}$ alkenyl group, such as a vinyl group, an allyl group, a methallyl group, a 1-propenyl group, an isopropenyl group, a 1-butenyl group, a 2-butenyl group, a 3-butenyl group, a 1-pentenyl group, a 2-pentenyl group, a 3-pentenyl group, a 4-pentenyl group, and a 5-hexenyl group (preferably a $C_{4-20}$ alkenyl group, and more preferably a $C_{8-18}$ alkenyl group). Examples of the alkynyl group include a $C_{2-22}$ alkynyl group, such as an ethynyl group and a propynyl group (preferably a $C_{4-20}$ alkynyl group, and more preferably a $C_{8-18}$ alkynyl group).

Examples of the alicyclic hydrocarbon group include a $C_{3-12}$ cycloalkyl group, such as a cyclopropyl group, a cyclobutyl group, a cyclopentyl group, a cyclohexyl group, and a cyclododecyl group; a $C_{3-12}$ cycloalkenyl group, such as a cyclohexenyl group; and a $C_{4-15}$ crosslinked cyclic hydrocarbon group, such as a bicycloheptanyl group and a bicycloheptenyl group.

Examples of the aromatic hydrocarbon group include a $C_{6-14}$ aryl group, such as a phenyl group and a naphthyl group (especially, a $C_{6-10}$ aryl group).

Examples of the heterocycle forming the heterocyclic group include those exemplified and described as the monovalent organic group in $R^1$ in Formula (1).

Examples of the group in which two or more of the monovalent hydrocarbon group and/or the monovalent heterocyclic group are bonded via a linking group include a group in which the monovalent hydrocarbon group and/or the monovalent heterocyclic group is bonded to an alkoxy group, an alkenyloxy group, an alkynyloxy group, an aryloxy group, an aralkyloxy group, an acyloxy group, an alkylthio group, an alkenylthio group, an arylthio group, an aralkylthio group, an acyl group, an alkenylcarbonyl group, an arylcarbonyl group, an aralkylcarbonyl group, an alkoxycarbonyl group, an alkenyloxycarbonyl group, an aryloxycarbonyl group, an aralkyloxycarbonyl group, a dialkylamino group, an acylamino group, an oxetanyl group-containing group, a carbamoyl group, or an epoxy group-containing group such as a glycidyloxy group; or a group in which the monovalent hydrocarbon group and/or the monovalent heterocyclic group is bonded to two or more of the groups listed above.

The hydrocarbon group of the monovalent organic group may have a substituent. Examples of the substituent include a halogen atom, such as a fluorine atom, a chlorine atom, a bromine atom, and an iodine atom; a cyano group; an isocyanate group; and an isothiocyanate group. However, the monovalent organic group preferably has no hydroxy group, carboxy group, amino group, mono-substituted amino group, terminal alkenyl group, or terminal epoxy group (in particular, no functional group containing active hydrogen) as the substituent other than —Y—H.

The $R^2$ preferably contains a hydrocarbon group having 4 or more continuous carbon atoms in a linear chain. Examples of such a hydrocarbon group include a linear alkylene group, such as a tetramethylene group, a pentamethylene group, a hexamethylene group, a heptamethylene group, an octamethylene group, a nonamethylene group, and a decamethylene group; a branched alkylene group, such as a 2-ethylhexamethylene group; a linear alkenylene group, such as a 1-butenylene group, a 2-butenylene group, a 1-pentenylene group, a 2-pentenylene group, and a 3-pentenylene group; a branched alkenylene group, such as a 2-methyl-2-butenylene group; an alicyclic hydrocarbon group having 4 or more carbons, such as a cyclohexyl group; an aromatic hydrocarbon group having 6 or more carbons, such as a phenyl group; and a heterocyclic group containing a structure having 4 or more continuous carbon atoms, such as a piperidine ring.

In Formula (2), a molar ratio of carbon atoms to a total amount of heteroatoms selected from the group consisting of nitrogen atoms, oxygen atoms, sulfur atoms, and silicon atoms is preferably 4.5 or higher, more preferably 5 or higher, and even more preferably 5.5 or higher. With the molar ratio of 4.5 or higher, the resulting surface-modified ND particles have excellent dispersibility in the organic dispersion medium as a lubricant base. The molar ratio may be 22 or lower, or 20 or lower.

The compound represented by Formula (2) has preferably from 6 to 22 carbon atoms and more preferably from 8 to 20 carbon atoms. The compound represented by Formula (2) having 6 or more carbon atoms provides sufficient steric hindrance between the surface-modifying groups and facilitates dispersion of the resulting surface-modified ND particles in the organic dispersion medium as a lubricant base. The compound represented by Formula (2) having 22 or less carbon atoms suppresses entanglement between the surface-modifying groups and facilitates dispersion of the resulting surface-modified ND particles in the organic dispersion medium as a lubricant base.

Among these, the monovalent organic group is preferably a monovalent substituted or unsubstituted hydrocarbon group, a group in which a monovalent substituted or unsubstituted hydrocarbon group is bonded to an alkoxy group, or a group in which a monovalent substituted or unsubstituted hydrocarbon group is bonded to a dialkylamino group.

In particular, in Formula (2) above, Y is preferably —O—, —C(=O)—O—, or —NH—. When Y is —O— or —C(=O)—O—, $R^2$ is preferably a monovalent substituted or unsubstituted hydrocarbon group and more preferably a linear or branched hydrocarbon group having from 8 to 20 carbons.

When Y is —NH—, $R^2$ is preferably a monovalent organic group containing from 8 to 20 carbon atoms. In addition, when Y is —NH—, $R^2$ is preferably a monovalent organic group containing a hydrocarbon group having 4 or more continuous carbon atoms in a linear chain.

The reaction described above is carried out in a state where the ND particles are nanodispersed in water, that is, the reaction is carried out in a water dispersion composition of the ND particle. A median diameter (D50) of the ND particles in the water dispersion composition is preferably from 1 to 100 nm, more preferably from 1 to 50 nm, and even more preferably from 1 to 10 nm. With the median diameter within the above range, large amounts of hydroxy groups and/or carboxy groups are present on the surface of the ND particle, and this allows more reactions with the compound represented by Formula (2) above to proceed. In addition, the resulting surface-modified ND particles have excellent dispersibility.

The acid catalyst can be a known or commonly-used acid catalyst used in, for example, esterification of a carboxylic acid and an alcohol, a dehydration condensation reaction of an alcohol and an amine, a dehydration condensation reaction of an alcohol and a thiol. Examples of the acid catalyst include a sulfonic acid group-containing compound, hydrochloric acid, nitric acid, sulfuric acid, sulfur trioxide, phosphoric acid, boric acid, a trihaloacetic acid (such as trichloroacetic acid and trifluoroacetic acid), a salt thereof (such as an ammonium salt), and an inorganic solid acid. Only one, or two or more of the acid catalysts may be used.

The acid catalyst may be in either a form of a homogeneous catalyst that may dissolve in a solvent or substrate during the reaction or in a form of a heterogeneous catalyst that does not dissolve during the reaction. Examples of the heterogeneous catalyst include a supported catalyst in which an acid component is supported on a carrier.

Examples of the sulfonic acid group-containing compound include an aliphatic sulfonic acid, such as methanesulfonic acid, ethanesulfonic acid, propanesulfonic acid, butanesulfonic acid, dodecanesulfonic acid, hexadecanesulfonic acid, trifluoromethanesulfonic acid, and heptadecafluorooctanesulfonic acid; an alicyclic sulfonic acid, such as 10-camphorsulfonic acid; an aromatic sulfonic acid, such as benzenesulfonic acid, p-toluenesulfonic acid, 2,4,6-trimethylbenzenesulfonic acid, hexylbenzenesulfonic acid, octylbenzenesulfonic acid, decylbenzenesulfonic acid, dodecylbenzenesulfonic acid (DBSA), octadecylbenzenesulfonic acid, 1-naphthalenesulfonic acid, 2-naphthalenesulfonic acid, and butyl-2-naphthalenesulfonic acid; and a sulfonic acid type ion-exchange resin, 3-[trioctylammonio]propane-1-sulfonic acid-triflimide, 4-[trioctylammonio]butane-1-sulfonic acid-triflimide, and a compound represented by Formula (A) below:

[Chem. 1]

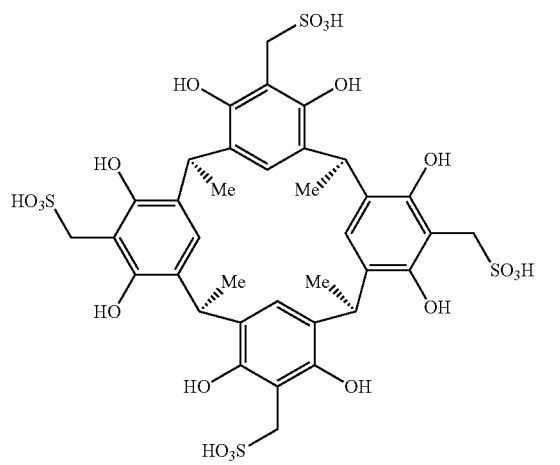

(A)

Examples of the inorganic solid acid include silica, silica-alumina, alumina, zeolites, activated clay, and montmorillonite.

Examples of the ammonium salt as the acid catalyst include a salt of an ammonium ion represented by Formula (B-1) below, a salt of an ammonium ion represented by Formula (B-2) below, a salt of an ammonium ion represented by Formula (B-3) below, and a salt of an ammonium ion represented by Formula (B-4) below:

[Chem. 2]

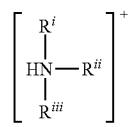

(B-1)

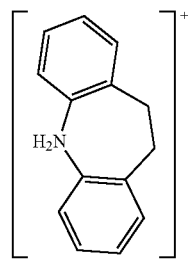

(B-2)

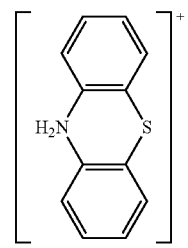

(B-3)

-continued

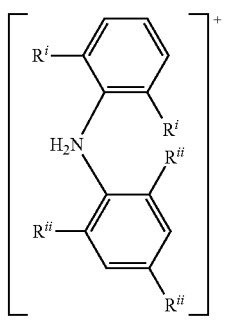

(B-4)

[Chem. 3]

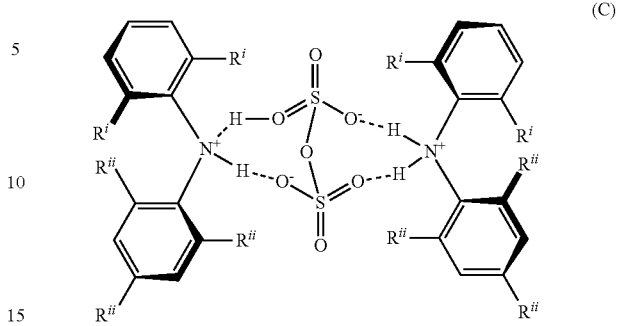

(C)

In Formula (B-1) above, $R^I$ to $R^{III}$ are identical or different and represent a hydrogen atom, an aliphatic hydrocarbon group, or a group containing an aromatic hydrocarbon group. The aliphatic hydrocarbon group is preferably a linear or branched $C_{1-22}$ hydrocarbon group. Examples of the group containing an aromatic hydrocarbon group include an aromatic hydrocarbon group, such as a phenyl group; and a group in which an aliphatic hydrocarbon group and an aromatic hydrocarbon group are bonded, such as a 4-t-butylphenyl group and a mesityl group. Among these, two or more of the $R^I$ to $R^{III}$ are preferably a group containing an aromatic hydrocarbon group.

The acid anion serving as the counter anion of the ammonium ion represented by Formulas (B-1) to (B-3) above is preferably a sulfonate ion, more preferably an aromatic sulfonate ion, and particularly preferably a p-dodecylbenzene sulfonate ion.

In Formula (B-4) above, $R^i$ and $R^{ii}$ are identical or different and represent a hydrogen atom, an aliphatic hydrocarbon group, or a group containing an aromatic hydrocarbon group. The aliphatic hydrocarbon group is preferably a linear or branched $C_{1-4}$ hydrocarbon group. Examples of the group containing an aromatic hydrocarbon group include an aromatic hydrocarbon group, such as a phenyl group, and a group in which an aliphatic hydrocarbon group and an aromatic hydrocarbon group are bonded. Among these, a hydrogen atom, a methyl group, an isopropyl group, and a phenyl group are preferable.

The acid anion serving as the counter anion of the ammonium ion represented by Formula (B-4) above is preferably a sulfonate ion or a sulfate ion, and particularly preferably a trifluoromethanesulfonate ion, a 10-camphorsulfonate ion, a benzenesulfonate ion, or a sulfate ion.

The acid anion serving as the counter anion of the ammonium ion represented by Formulas (B-1) to (B-4) above may form a complex salt by forming a hydrogen bond with an oxygen atom forming an acid group and a hydrogen atom on a nitrogen atom in Formulas (B-1) to (B-4) above. Regarding the complex salt, one ammonium cation and one acid anion may form one salt, or two ammonium cations and two acid anions may form one salt; the number of ammonium cations and the number of acid anions forming one salt is not particularly limited. Furthermore, the acid anion may form a multimer in one salt. For example, a sulfuric acid that forms sulfate ions may form a structure represented by $[H_2SO_4(SO_3)_x]$. Examples of the complex salt formed by an acid anion and Formula (B-4) above include a compound represented by Formula (C) below:

In Formula (C) above, $R^i$ and $R^{ii}$ are the same as those in Formula (B-4) above.

Among these, from the viewpoint of further promoting the reaction described above, the acid catalyst is preferably a sulfonic acid group-containing compound or an ammonium salt of a sulfonic acid group-containing compound.

A ratio of the ND particles to the compound represented by Formula (2) above (former:latter, mass ratio) subjected to the reaction is, for example, from 1:1 to 1:25. In addition, a concentration of the ND particles in the water dispersion composition is, for example, from 1 to 10 mass %, and a concentration of the compound represented by Formula (2) above in the water dispersion composition is, for example, from 1 to 60 mass %.

Reaction conditions for the ND particles and the compound represented by Formula (2) above can be appropriately selected from ranges of, for example, a temperature of 0 to 100° C., a reaction time of 1 to 48 hours, and a pressure of from 1 to 5 atm.

A content ratio of the ND particles in the lubricant composition (Y) is, for example, from 0.01 to 5.0 mass %, preferably from 0.1 to 4.0 mass %, more preferably from 0.25 to 3.0 mass %, and even more preferably from 0.5 to 2.0 mass %. The content ratio of the ND particles in the lubricant composition (Y) is, for example, from 0.1 to 2000 mass ppm, preferably from 0.2 to 1000 mass ppm, more preferably from 0.5 to 500 mass ppm, and even more preferably from 1.0 to 100 mass ppm. The lubricant composition (Y) has excellent dispersibility of the ND particles and thus has excellent dispersibility in the organic dispersion medium as a lubricant base even with such two-phase content ratios. Thus, for example, the content ratio of the ND particles in the lubricant composition (Y) during distribution can be different from that in use, such as from 0.01 to 5.0 mass % during distribution and from 0.1 to 2000 mass ppm in use. In addition, with the content ratio from 0.1 to 2000 mass ppm, the lubricant composition (Y) provides an even better effect including reducing the coefficient of friction in the boundary lubrication region, suppressing the seizure of the sliding member, reducing the wear amount of the sliding member, and expanding the mixed lubrication region and the fluid lubrication region. The content ratio of the ND particles can be calculated from the absorbance at 350 nm.

A content ratio of a solvent in the lubricant composition (Y) is, for example, from 90 to 99.9999 mass %. In addition, a content ratio of the organic dispersion medium as a lubricant base in a total amount of a solvent is, for example, 60 mass % or higher, preferably 70 mass % or higher, more preferably 80 mass % or higher, and particularly preferably 90 mass % or higher.

When the content ratio of the ND particles in the lubricant composition (Y) is from 0.01 to 5.0 mass %, the average dispersed particle size (D50) of the ND particles in the lubricant composition (Y) is, in particular, preferably from 2 to 50 nm, more preferably from 4 to 30 nm, even more preferably from 6 to 25 nm, and particularly preferably from 10 to 20 nm.

When the content ratio of the ND particles in the lubricant composition (Y) is from 0.1 to 2000 mass ppm, the average dispersed particle size (D50) of the ND particles in the lubricant composition is, in particular, preferably from 5 to 100 nm, more preferably from 8 to 80 nm, even more preferably from 10 to 60 nm, still more preferably from 15 to 40 nm, and particularly preferably from 18 to 35 nm.

The lubricant composition (Y) preferably has a haze value of 5 or lower, more preferably 3 or lower, and even more preferably 1 or lower. The lubricant composition (Y) has excellent dispersibility of the ND particles and thus can provide a lubricant composition having the haze value described above. The haze value can be measured based on JIS K 7136.

The lubricant composition (Y) may consist only of the ND particles and the organic dispersion medium or may contain an additional component. Examples of the additional component include surfactants, thickeners, coupling agents, dispersants, rust inhibitors, corrosion inhibitors, freezing point depressants, antifoaming agents, antiwear additives, antiseptics, and colorants. A content ratio of the additional component relative to a total amount of the lubricant composition (Y) is, for example, 30 mass % or lower, preferably 20 mass % or lower, more preferably 10 mass % or lower, even more preferably 5 mass % or lower, and particularly preferably 1 mass % or lower. Thus, a total content ratio of the ND particles and the lubricant base relative to a total amount of the lubricant composition (Y) is, for example, 70 mass % or higher, preferably 80 mass % or higher, more preferably 90 mass % or higher, even more preferably 95 mass % or higher, and particularly preferably 99 mass % or higher.

The lubricant composition (Y) can be manufactured, for example, by mixing and dispersing the surface-modified ND particles and, as necessary, an additional component in the organic dispersion medium as a lubricant base. The lubricant composition (Y) can also be manufactured by obtaining the water dispersion composition, then mixing and stirring a new dispersion medium before or after distilling off water in the dispersion composition with an evaporator or the like, that is, exchanging the solvent.

In obtaining the lubricant composition (Y) by exchanging the solvent, preferably, an organic dispersion medium with excellent dispersibility of NDs surface-modified at one end is added, water is removed by extraction and/or distillation to exchange the solvent, and then a new lubricant base is added. The solvent may be exchanged by adding a new lubricant base without adding the organic dispersion medium with excellent dispersibility of the surface-modified ND, and removing water by extraction and/or distillation. In addition, washing with water and/or saline may be carried out before removing the water. The lubricant base is appropriately selected from lubricant substrates used in the lubricant composition (Y) described above. Only one, or two or more of the lubricant bases may be used.

The lubricant composition (Y) can impart an excellent wear suppression effect and an excellent friction reduction effect to the sliding member, and the excellent wear suppression effect and the excellent friction reduction effect can prevent or suppress the seizure of the sliding member.

Method of Manufacturing Carbon Transfer Film and Sliding Member

The carbon transfer film (X) and the sliding member can be manufactured by relatively sliding the sliding surface of the substrate and a sliding surface of a member for sliding in the presence of a lubricant composition (e.g., the lubricant composition (A)) in which nanodiamond particles are nanodispersed and a content ratio of zirconia is lower than 100 mass ppm to form the carbon transfer film (X). The sliding presumably transfers carbon derived from the nanodiamond particles in the lubricant composition onto the substrate and in some cases further transfer a component in the substrate and/or the member for sliding together onto the substrate to form the carbon transfer film (X).

Figure 2:
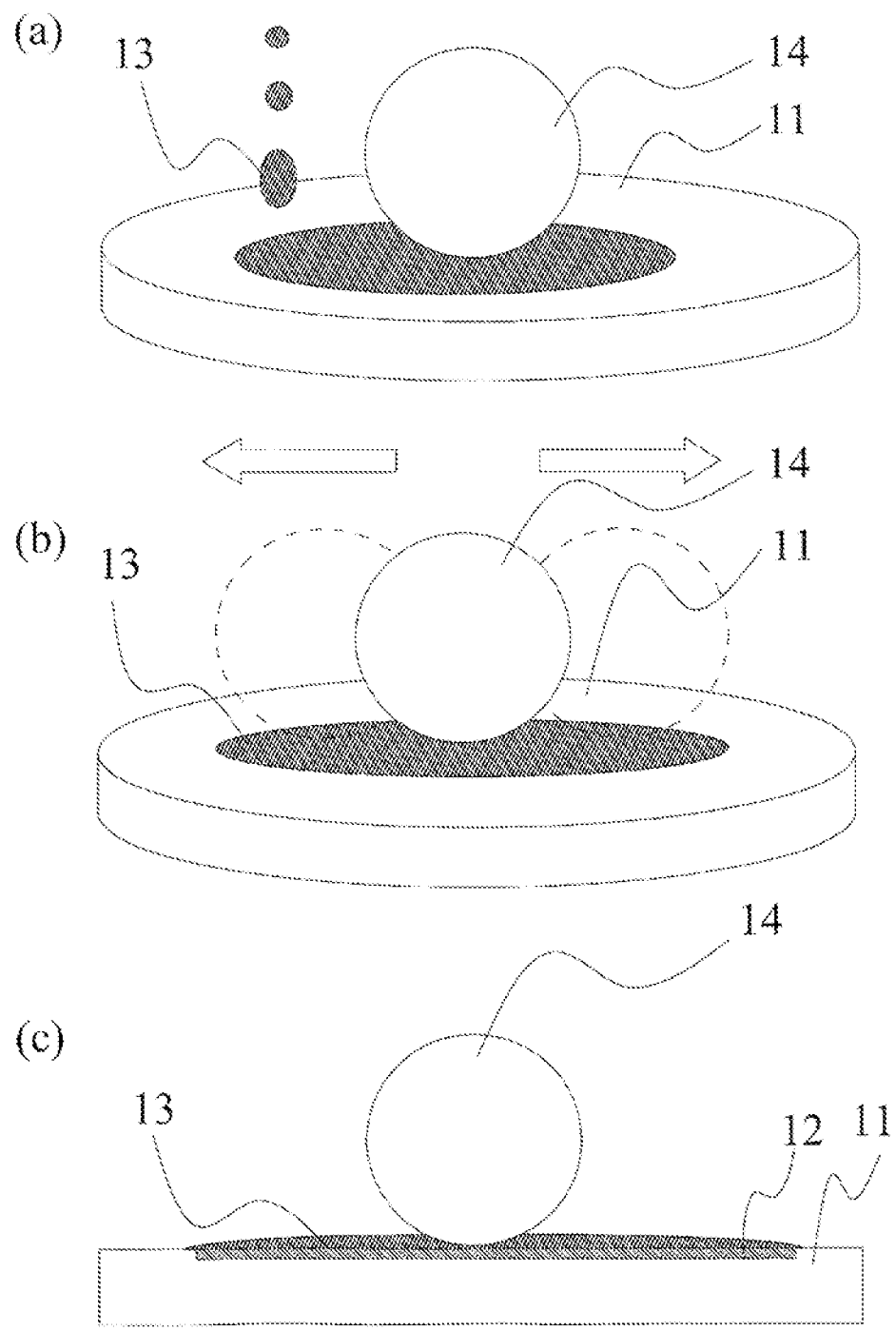
FIGS. 2(a), 2(b), and 2(c) are explanatory diagrams illustrating an example of a method of manufacturing a sliding member according to an embodiment of the present disclosure in which a carbon transfer film is formed.

An embodiment of the method of manufacturing the carbon transfer film (X) and the sliding member will be specifically described using FIG. 2. As illustrated in FIG. 2(a), in the method of manufacturing, first, a lubricant composition (the lubricant composition (A)) 13 in which the ND particles is nanodispersed and the content ratio of zirconia is lower than 100 mass ppm is added dropwise onto the substrate 11. The member for sliding 14 is then placed in the region where the wet lubricant composition 13 spreads on the substrate 11. The order of applying the lubricant composition 13 and placing the member for sliding 14 may be reversed.

In FIG. 2, the member for sliding 14 is configured to be a sphere and the substrate 11 is configured to be a disk; however, the shapes and dimensions of the member for sliding and the substrate are not particularly limited and can be appropriately configured from various shapes and dimensions according to the application or the like. In addition, the hardness of the substrate and the member for sliding may be different or the same.

The member for sliding is for sliding with the sliding surface of the substrate to form the carbon transfer film (X). Examples of the member for sliding include metal materials, such as alloy steel (such as carbon steel, chromium steel, and chromium molybdenum steel) and steel for special applications (such as alloy tool steel, stainless steel (e.g., SUS), bearing steel (e.g., SUJ), and spring steel (e.g., SUP)); copper plates; aluminum plates; and titanium plates. A carbon film, such as a diamond-like carbon (DLC) film, may be provided on the surface of the member for sliding. In addition, the surface of the member for sliding may be subjected to a surface treatment of various types including an electrochemical treatment of various types, such as plating, a chemical conversion treatment, or anodic oxidation; coating of various types, such as flowable coating or powder coating; or a physical surface treatment, such as shot blasting.

Next, as illustrated in FIG. 2(b), the sliding surface of the substrate 11 and the sliding surface of the member for sliding 14 are relatively slid in the presence of the lubricant composition 13. At this time, the lubricant composition 13 is interposed between the substrate 11 and the member for sliding 14. Relatively sliding the substrate 11 and the member for sliding 14 probably allows the ND particles (not illustrated) contained in the lubricant composition 13 to self-form a localized high energy field in the friction portion due to pressure contact sliding between the substrate 11 and the member for sliding 14, and this probably promotes the reaction and transfer carbon derived from the ND particles to the surface of the substrate 11. Furthermore, a component derived from the substrate 11 and/or the member for sliding 14 may also be transferred onto the substrate 11.

The sliding is not particularly limited and may be reciprocation or sliding in the circumferential direction. The sliding can be performed, for example, by known or commonly used sliding, such as ball (pin)-on-disk rotating, ball (pin)-on-disk reciprocating, thrust cylinder, block-on-ring, four-ball, pin-block, or vibration friction wear.

In the illustrated example, a low friction surface is formed on the surface of the substrate 11. A film containing a large amount of oxygen is formed on the low friction surface. This is probably due to formation of a film having the low friction surface by a tribochemical reaction in a system where the ND particles are present.

Then, as illustrated in FIG. 2(c), a carbon transfer film (X) 12 is formed on the surface of the substrate 11 with the ND particles (not illustrated) contained in the lubricant composition 13 by friction due to the pressure contact sliding between the substrate 11 and the member for sliding 14. In addition, the carbon transfer film 12 may also be formed on the surface of the member for sliding 14 according to the same principal. The carbon transfer film 12 is formed by sliding in the presence of the lubricant composition with a low content of zirconia, thus this prevents transfer of zirconium derived from zirconia, and the carbon transfer film 12 has a low content of zirconium. In FIG. 2, the substrate 11 and the member for sliding 14 may be reversed, that is, the substrate 11 may be a sphere, and the member for sliding 14 may be a disk.

The sliding may be carried out under boundary lubrication conditions. The method of manufacturing the carbon transfer film (X) and the sliding member can manufacture a carbon transfer film excellent in a friction reduction effect and a wear suppression effect, and a sliding member in which the carbon transfer film is formed even under extremely harsh conditions such as boundary lubrication conditions. In the present specification, "under boundary lubrication conditions" refers to carrying out the sliding in the boundary lubrication region described above.

In the manner described above, the carbon transfer film (X) and the sliding member can be manufactured. The carbon transfer film (X) and the sliding member thus obtained are excellent in a friction reduction effect and a wear suppression effect. This enables achieving friction reduction and wear suppression of the carbon transfer film itself and simultaneously achieving friction reduction and wear suppression of the sliding partner member. In addition, this can prevent or suppress the seizure of the sliding member.

Each aspect disclosed in the present specification can be combined with any other feature disclosed in the present specification. Each configuration, combinations of them, and the like in each embodiment is an example, and configurational additions, omissions, substitutions, and other changes can be appropriately made within a scope not departing from the spirit of the present disclosure. In addition, each aspect of the invention according to the present disclosure is not limited by the embodiments or the following examples but is limited only by the claims.

EXAMPLES

Hereinafter, the present disclosure will be described in more detail based on examples, but the present disclosure is not limited by examples.

Example 1

A surface-modified ND particle, a lubricant composition, a transfer film, and a sliding member were manufactured through the following processes.

Production of Surface-Modified ND Particles and Lubricant Composition

First, ND was formed by a detonation method. In the present formation, first, a molded explosive attached with an electric detonator was placed inside a pressure-resistant vessel for detonation, and the vessel was sealed. The vessel was made of iron and had a capacity of 15 m$^3$. As the explosive, 0.50 kg of a mixture of TNT and RDX was used. The mass ratio of the TNT and RDX (TNT/RDX) in the explosive was 50/50. The electric detonator was then triggered to detonate the explosive in the vessel (formation of ND by detonation method). Then, the vessel was allowed to stand at room temperature for 24 hours to lower the temperatures of the vessel and its interior. After this cooling, an ND crude product (containing agglutinated ND particles and soot produced by the detonation method described above) deposited on the inner wall of the vessel was scraped with a spatula, and the ND crude product was collected.

An oxidation treatment was then performed. The ND crude product obtained by performing the formation described above multiple times was subjected to oxidation treatment. Specifically, 6 L of 98 mass % sulfuric acid and 1 L of 69 mass % nitric acid were added to the ND crude product to form a slurry, and then the slurry was subjected to heat treatment under reflux at normal pressure conditions for 48 hours. The heating temperature in this oxidation treatment was from 140 to 160° C. Next, after cooling, the solid (containing the ND agglutinate) was washed with water by decantation. The initial supernatant liquid from the water washing was colored, and thus washing of the solid content with water by decantation was repeated until the supernatant liquid became visually transparent. Thereafter, the solid content was dried, and the ND agglutinate was obtained as a powder. Furthermore, the powder was heated in a rotary kiln, into which a gas of about 8 volume % oxygen and about 92 volume % nitrogen was blown at a flow rate of 20 L/min at 400° C. for 6 hours.

Next, the pH of about 30 mL of the slurry containing the ND agglutinate obtained through the oxidation treatment described above was adjusted to 10 using ammonia water, and then bead milling was performed using a bead milling apparatus (trade name "Parallel 4-Tube Sand Grinder Model LSG-4U-2L", available from Aimex Co., Ltd.). Specifically, 30 mL of the slurry after the ultrasonic irradiation and zirconia beads with a diameter of 30 μm were charged in a vessel (available from Aimex Co., Ltd.), which was a 100-mL mill vessel, and the vessel was sealed. Then, the apparatus was operated to perform bead milling. In this bead milling, the charged amount of zirconia beads is, for example, 33 volume % of the capacity of the mill vessel, the rotation speed of the mill vessel is 2570 rpm, and the duration of the milling is 3 hours.

Next, the slurry having undergone the disintegration as described above was subjected to centrifugation treatment (classification operation) using a centrifuge. The centrifugal force in this centrifugation treatment was 20000×g, and the duration of the centrifugation was 30 minutes. Next, 10 mL of supernatant of the ND-containing solution having undergone the centrifugation treatment was collected. In this manner, an ND aqueous dispersion in which nanodiamond was dispersed in pure water was obtained. This ND aqueous dispersion had a solid content concentration of 6.0 mass % and a pH of 9.0. The median diameter (particle size D50) of the ND aqueous dispersion obtained as described above was 6.0 nm.

Next, to 1 g of the ND aqueous dispersion obtained through the disintegration described above, 0.5 mmol of dodecylbenzenesulfonic acid as an acid catalyst and 2 mmol of n-octadecanol were added, and the mixture was reacted under stirring at 80° C. for 8 hours. After completion of the reaction, the reaction residue and the acid catalyst were removed, the solvent was replaced with toluene, and a surface-modified ND toluene dispersion was obtained. The median diameter (particle size D50) of the surface-modified ND particles in the resulting surface-modified ND toluene dispersion was about 18 nm, and the mass ratio [ND/surface-modifying group] determined by thermogravimetric analysis was 14.6. To this surface-modified ND toluene dispersion, 10 mL of a lubricating oil (trade name "Mobil Velocite Oil No. 10", available from Exxon Mobil Corporation) was added, and a lubricant composition in which ND particles modified with a n-octadecanoxy group were nanodispersed was obtained.

Production of Transfer Film

The lubricant composition was diluted with the lubricating oil to give a concentration of the surface-modified ND particles of 500 mass ppm, and the diluted lubricant composition was used as a lubricant composition for transfer film formation. An SRV friction tester (device name "The Basic SRVS Oscillation System", available from Optimol) was used to form the transfer film. An SUJ2 ball with a diameter of 10 mm and an SUJ2 disk with a diameter of 24 mm and a thickness of 7.85 mm, both of which had been subjected to a mirror polishing process (Ra=25 nm or less) after quenching, were used as a ball and a disk in the SRV friction tester. At the start of sliding of the ball and disk, 10 μL of the lubricant composition was dripped onto the sliding surface of the disk surface, and the test was performed at room temperature. The conditions for the transfer film formation were an initial load of 100 N, an amplitude of 1.5 mm, a frequency of 50 Hz, and a duration of 20 minutes. Subsequently, the ball and disk were removed from the friction tester and washed with hexane and acetone to remove the lubricant composition. A transfer film was thus formed on the surface of the substrate made of SUJ2, which was a disk, and a transfer film and a sliding member of Example 1 were obtained.

Example 2

A transfer film and a sliding member of Example 2 were obtained by forming a transfer film in the same manner as in Example 1 except that the surface modified ND particle concentration in the lubricant composition for transfer film formation was set to 100 mass ppm.

Comparative Example 1

Production of Surface-Modified ND Particle

First, ND was formed by a detonation method. In the present formation, first, a molded explosive attached with an electric detonator was placed inside a pressure-resistant vessel for detonation, and the vessel was sealed. The vessel was made of iron and had a capacity of 15 m$^3$. As the explosive, 0.50 kg of a mixture of TNT and RDX was used. The mass ratio of the TNT and RDX (TNT/RDX) in the explosive was 50/50. The electric detonator was then triggered to detonate the explosive in the vessel (formation of nanodiamond by detonation method). Then, the vessel was allowed to stand at room temperature for 24 hours to lower the temperatures of the vessel and its interior. After this cooling, an ND crude product (containing agglutinated ND particles and soot produced by the detonation method described above) deposited on the inner wall of the vessel was scraped with a spatula, and the ND crude product was collected.

The ND crude product obtained by performing the formation described above multiple times was then subjected to an acid treatment. Specifically, 6 L of 10 mass % hydrochloric acid was added to 200 g of the ND crude product to prepare a slurry, and the slurry was subjected to a heating treatment for 1 hour under reflux at the normal pressure condition. The heating temperature in this acid treatment was from 85 to 100° C. Next, after cooling, the solid (containing the ND agglutinate and soot) was washed with water by decantation. The solid was repeatedly washed with water by decantation until the pH of a precipitation liquid reached 2 from the low pH side.

An oxidation treatment was then performed. Specifically, to the precipitation liquid (containing the ND agglutinate) prepared through decantation after the acid treatment, 6 L of a 98 mass % sulfuric acid and 1 L of a 69 mass % nitric acid were added to form a slurry, and then the slurry was subjected to heat treatment under reflux at normal pressure conditions for 48 hours. The heating temperature in this oxidation treatment was from 140 to 160° C. Next, after cooling, the solid (containing the ND agglutinate) was washed with water by decantation. The initial supernatant liquid from the water washing was colored, and thus washing of the solid content with water by decantation was repeated until the supernatant liquid became visually transparent.

Next, 1000 mL of the ND-containing solution obtained through the water washing treatment described above was subjected to spray drying using a spray dryer (trade name "Spray Dryer B-290", available from Nihon BUCHI K.K.) (drying). Through the drying, 50 g of ND powder was obtained.

Into a reaction vessel was weighed 0.3 g of the ND particles obtained in the drying, 150 g of toluene as an organic dispersion medium and 12.0 g of hexadecyltrimethoxysilane as a silane compound were added, and the mixture was stirred for 10 minutes.

After stirring, 360 g of zirconia beads (trade name "YTZ", available from Tosoh Corporation, diameter 30 μm) was added. After the addition, under cooling in ice water, the mixture was subjected to an ultrasonic treatment for 20 hours using an ultrasonic disperser (model "UP-400s", available from Hielscher Ultrasonics GmbH) in a state where a tip of an oscillator of the ultrasonic disperser was immersed in the solution in the reaction vessel, and the ND particles and the silane compound were reacted. The mixture was initially gray, but the particle size gradually became smaller, and the dispersion state improved. Finally, the mixture became a uniform, black liquid. This is probably because the ND particles were gradually untied (disintegrated) from the agglutinated ND particle, the silane compound acted on and bonded to the dissociated ND particle, and the surface-modified ND particles were dispersed and stabilized in toluene. A surface-modified ND dispersion (toluene dispersion) in which the surface-modified ND particles having the silane compound bonded to the surface was nanodispersed was thus obtained. The particle size distribution of the ND particles in the resulting ND dispersion was measured by dynamic light scattering (non-contact backscattering) using a device available from Malvern Panalytical Ltd. (trade name "Zetasizer Nano ZS"), and the average dispersed particle size (D50) of the ND particles was determined to be 12 nm.

Next, to the toluene dispersion obtained through the disintegration described above, 10 mL of a lubricant oil (trade name "Mobil Velocite Oil No. 10", available from Exxon Mobil Corporation) was added, then stirred and mixed and dispersed. In the manner described above, a lubricant composition in which surface-modified ND particles having a silane compound bonded to the surface was nanodispersed was obtained.

Production of Transfer Film

The lubricant composition was diluted with the lubricating oil to give a concentration of the surface-modified ND particles of 500 mass ppm, and the diluted lubricant composition was used as a lubricant composition for transfer film formation. The zirconia concentration in the lubricant composition is 950 mass ppm.

A transfer film and a sliding member of Comparative Example 1 were obtained by forming a transfer film in the same manner as in Example 1 except that the lubricant composition obtained above was used as the lubricant composition for transfer film formation.

Comparative Example 2

A transfer film and a sliding member of Comparative Example 2 were obtained by forming a transfer film in the same manner as in Example 1 except that the surface modified ND particle concentration in the lubricant composition for transfer film formation was set to 100 mass ppm.

Evaluation

The transfer films and sliding members produced in Examples 1 and 2 and Comparative Examples 1 and 2 were evaluated for the following.

(1) Evaluation of Low Friction Effect

Figure 3:
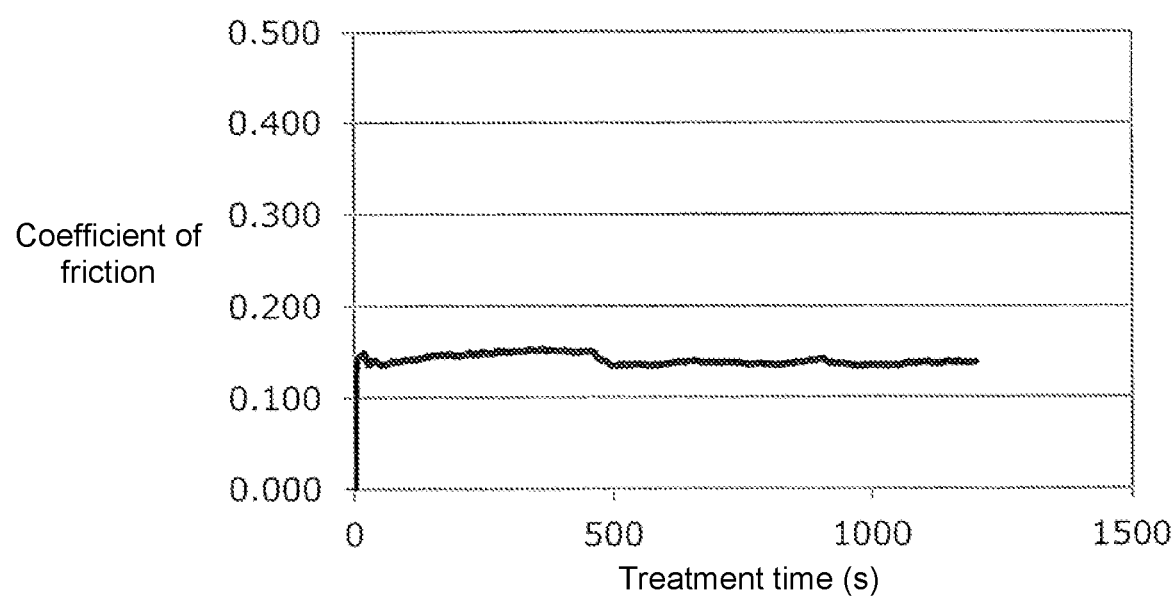
FIG. 3 is a graph showing a transition of a coefficient of friction from a start to an end of transfer film formation in Example 2.

In Example 2 and Comparative Example 2, the change in the coefficient of friction from the start to the end of the transfer film formation was measured, and the low friction effect was evaluated. That is, the change in friction reduction effect during the process of obtaining the sliding member on which the transfer film was formed was evaluated. The results of Example 2 are shown in FIG. 3, and the results of Comparative Example 2 in FIG. 4.

(2) Wear Cross-Sectional Area Measurement

Figure 5:
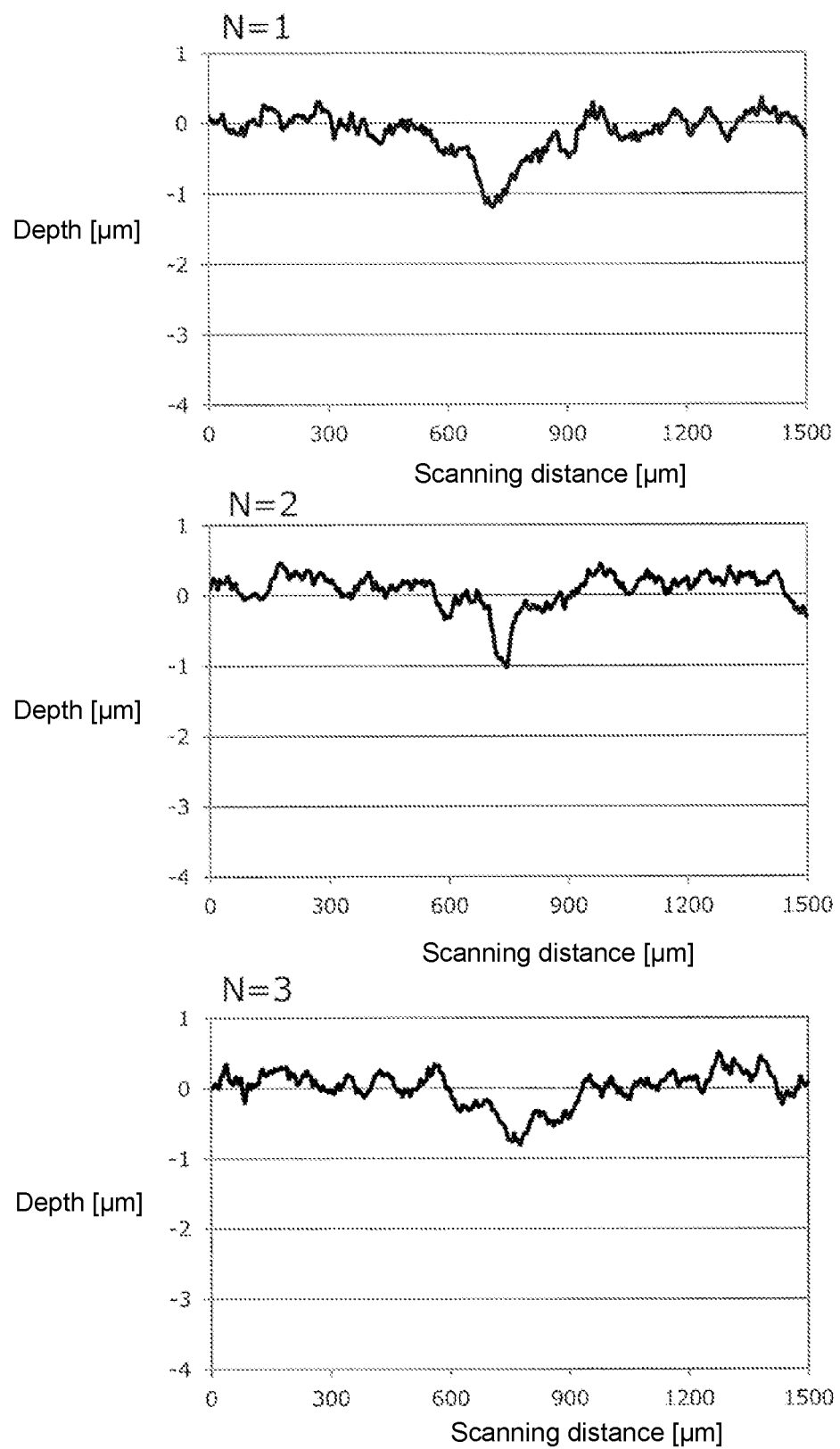
FIG. 5 is a cross-sectional profile obtained when a wear cross-sectional area of the transfer film of Example 2 was determined.
Figure 6:
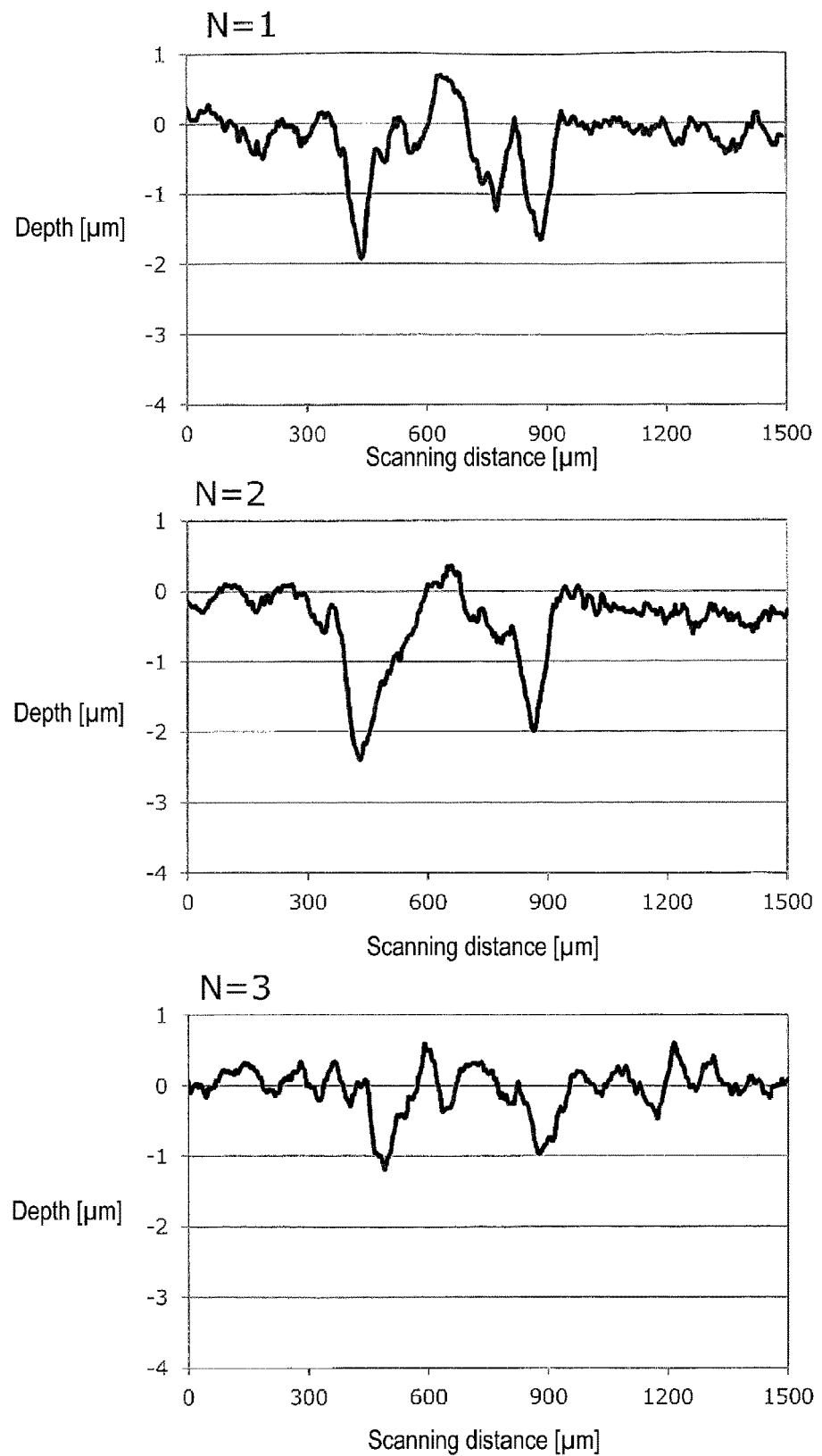
FIG. 6 is a cross-sectional profile obtained when a wear cross-sectional area of the transfer film of Comparative Example 2 was determined.

For the disks in the sliding members obtained in Example 2 and Comparative Example 2, the wear region was scanned with a double scan high precision laser measuring device (trade name "LT-9000", available from Keyence Corporation), the cross-sectional profile at any location was obtained, and the wear cross-sectional area was measured (N=3). As a result, the average value of the wear cross-sectional area at N3 was 137 μm$^2$ for Example 2 and 295 μm$^2$ for Comparative Example 2. For the resulting cross-sectional profile, the results of Example 2 are shown in FIG. 5, and the results of Comparative Example 2 in FIG. 6.

(3) SEM-EDX Measurement

The transfer film surfaces obtained in Examples and Comparative Examples were measured under a condition of an accelerating voltage of 5 kV using a scanning electron microscope (SEM) (trade name "SU5000", available from Hitachi High-Technologies Corporation) and an energy-dispersive X-ray spectroscopy instrument (trade name "X-Max 50" (available from OXFORD instruments), and a ratio of zirconium was calculated. As a result, zirconium was not detected in Examples 1 and 2, and the ratio of zirconium was 5.7 mass % in Comparative Example 1 and 0.7 mass % in Comparative Example 2.

Example 3

A transfer film was formed using the lubricant composition for transfer film formation produced in Example 1 as follows. A ball-on-disk type sliding friction tester (device name "UMT-3", available from Bruker Corporation) was used for the formation of the transfer film. An SUJ2 ball with a diameter of 4 mm and an SUJ2 disk, both of which had been subjected to a mirror polishing process (Ra=25 nm or less) after quenching, were used as a ball and a disk in the friction tester. Then, a silicon substrate was fixed with a resin on the sliding surface of the SUJ2 disk, and the ball and the silicon substrate surface of the disk were slid. At the start of sliding of the ball and disk, 10 μL of the lubricant composition for transfer film formation was dripped onto the sliding surface of the silicon substrate surface, and the test was performed at room temperature. The conditions for the transfer film formation were a radius of gyration of 4 mm, a rotation speed of 100 rpm (peripheral speed of 42 mm/s), a load of 4.9 N, a heating stage set temperature of 50° C., and a rotation time of 10 minutes. Subsequently, the ball and disk were removed from the friction tester and washed with hexane and acetone to remove the lubricant composition. A transfer film and a sliding member of Example 3 were thus obtained.

Example 4

A transfer film and a sliding member of Example 3 were obtained by forming a transfer film in the same manner as in Example 3 except that the lubricant composition for transfer film formation produced in Example 2 was used as the lubricant composition for transfer film formation.

Comparative Example 3

A transfer film and a sliding member of Comparative Example 3 were obtained by forming a transfer film in the same manner as in Example 3 except that the lubricant composition for transfer film formation produced in Comparative Example 1 was used as the lubricant composition for transfer film formation.

Comparative Example 4

A transfer film and a sliding member of Comparative Example 4 were obtained by forming a transfer film in the same manner as in Example 3 except that the lubricant composition for transfer film formation produced in Comparative Example 2 was used as the lubricant composition for transfer film formation.

Evaluation

The transfer films and sliding members produced in Examples 3 and 4 and Comparative Examples 3 and 4 were evaluated for the following. Here, Raman spectroscopic analysis and film thickness measurement were performed on the transfer film formed on the silicon substrate. This is because forming a transfer film on the silicon substrate having a smooth surface allows a more uniform transfer film to be obtained, and this enables Raman spectroscopic analysis and film thickness measurement to be simply performed. In addition, the carbon transfer film reacts with neither silicon nor iron, and thus the difference in the material of the substrate does not affect the Raman spectroscopic analysis results or the film thickness of the transfer film to be formed.

(3) Raman Spectroscopic Analysis

Figure 7:
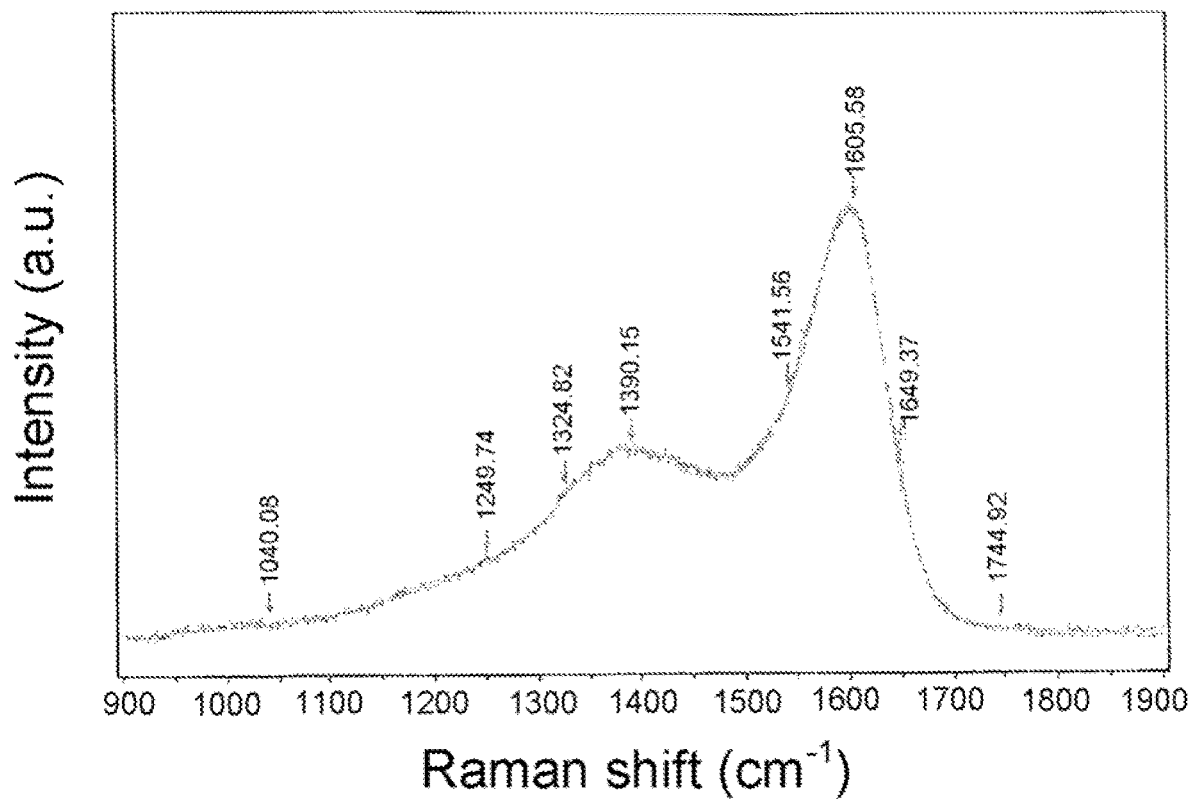
FIG. 7 is a Raman spectrum of the transfer film of Example 4.

The transfer film surfaces obtained in Examples and Comparative Examples were irradiated using a microlaser Raman spectrometer (trade name "LabRAM HR Evolution", available from Horiba, Ltd.) under the following measurement conditions. As a result, in all Examples and Comparative Examples, the transfer films were determined to be carbon transfer films containing $sp^2$-bonded carbon and $sp^3$-bonded carbon, the carbon derived from ND. The resulting Raman spectrum of Example 4 is shown in FIG. 7. In the Raman spectrum of the carbon transfer film of Example 4, a peak of $sp^3$-bonded carbon was observed at 1325 $cm^{-1}$, peaks of D band at 1390 $cm^{-1}$ and 1542 $cm^{-1}$, and a peak of G band at 1606 $cm^{-1}$. In addition, a ratio of the $sp^3$-bonded carbons to a sum of the $sp^2$-bonded carbons and the $sp^3$-bonded carbons, $sp^3/(sp^2+sp^3)$, in the carbon transfer film of Example 4 was determined to be 0.096.

Measured light source: 325 nm
Output: 1.075 mW
Exposure time: 10 seconds
Cumulative number of scans: 4 times (4) Film Thickness Measurement For each of stages at 5 minutes and 10 minutes of rotation time in the transfer film formation of Example 4, the film thickness of the formed transfer film was measured. The film thickness was measured by laser microscopic observation. As a result, the film thickness of the transfer film at the stage of 5 minutes of rotation time was 5 nm, and the film thickness of the transfer film at the stage of 10 minutes of rotation time was 18 nm.

Figure 4:
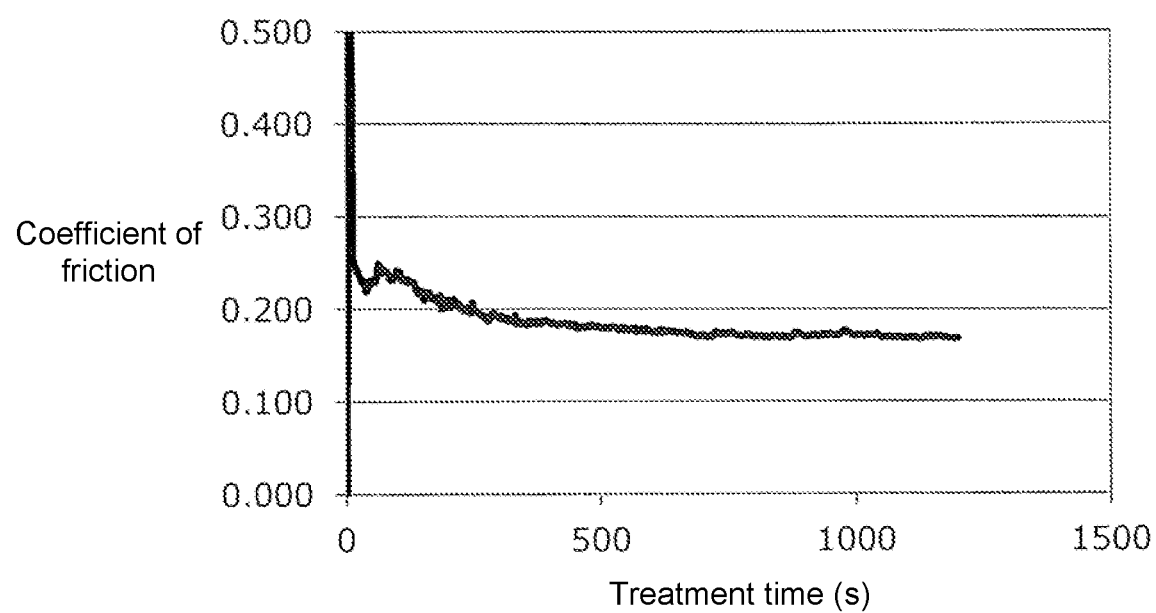
FIG. 4 is a graph showing a transition of a coefficient of friction from a start to an end of transfer film formation in Comparative Example 2.

The transfer film obtained in Example 2 contained $sp^2$-bonded carbon, had a thickness of 18 nm, and zirconium was not detected by elemental analysis of the surface by SEM-EDX measurement, and the content ratio of zirconium was determined to be 0.6 mass % or lower. In addition, as shown in FIG. 3, such a transfer film of Example 2 had a low and stable coefficient of friction approximately of 0.13 to 0.15 from the initial stage of formation (i.e., start of sliding). The wear stage area was 137 $\mu m^2$. On the other hand, the transfer film obtained in Comparative Example 2 had a thickness of 13 nm, and the content ratio of zirconium calculated from elemental analysis of the surface by SEM-EDX measurement was determined to be 0.7 mass %. Furthermore, as shown in FIG. 4, such a transfer film of Comparative Example 2 had a seizure occurring at the initial stage of formation (i.e., start of sliding), and the coefficient of friction increased. The coefficient of friction started to stabilize at approximately 500 seconds from the start of sliding, and the coefficient of friction at this stage was approximately from 0.16 to 0.18. The wear stage area was 295 $\mu m^2$. From this result, the transfer film of Example 2 had no seizure occurring at the initial stage of formation, was formed at an early stage, and had a low coefficient of friction, further a small wear cross-sectional area, and also a small wear amount compared to the transfer film of Comparative Example 2.

Hereinafter, variations of the invention according to the present disclosure will be described.

[Addendum 1] A carbon transfer film containing $sp^2$-bonded carbon, in which a ratio of zirconium calculated from elemental analysis of a surface by SEM-EDX measurement is 0.6 mass % or lower, and a thickness is less than 100 nm.

[Addendum 2] The carbon transfer film according to addendum 1, further containing $sp^3$-bonded carbon.

[Addendum 3] The carbon transfer film according to addendum 2, in which the $sp^3$-bonded carbon is carbon derived from diamond.

[Addendum 4] The carbon transfer film according to addendum 2 or 3, in which a ratio of the $sp^3$-bonded carbons to a sum of the $sp^2$-bonded carbons and the $sp^3$-bonded carbons, $sp^3/(sp^2+sp^3)$ is 0.2 or lower (preferably 0.1 or lower and more preferably lower than 0.1).

[Addendum 5] The carbon transfer film according to any one of addenda 2 to 4, having G band observed in a range of 1570 to 1640 $cm^{-1}$ (preferably from 1580 to 1640 $cm^{-1}$, more preferably from 1590 to 1630 $cm^{-1}$, and even more preferably from 1600 to 1620 $cm^{-1}$) and D band observed in a range of 1300 to 1400 $cm^{-1}$ in a Raman spectrum obtained by Raman spectroscopic analysis using a measurement light source of 325 nm.

[Addendum 6] The carbon transfer film according to any one of addenda 1 to 5, in which the $sp^2$-bonded carbon is carbon derived from diamond.

[Addendum 7] The carbon transfer film according to any one of addenda 1 to 6, in which a ratio of zirconium calculated from elemental analysis of a surface by SEM-EDX measurement is 0.6 mass % or lower (preferably 0.3 mass % or lower, more preferably 0.1 mass % or lower, and even more preferably 500 mass ppm or lower).

[Addendum 8] The carbon transfer film according to any one of addenda 1 to 7, in which a coefficient of friction of a surface is 0.2 or less (preferably 0.17 or less and more preferably 0.16 or less).

[Addendum 9] A sliding member including:

a substrate, and a carbon transfer film provided on at least one surface of the substrate, in which the carbon transfer film contains $sp^2$-bonded carbon and has a thickness of less than 100 nm, and a ratio of zirconium calculated from elemental analysis of the carbon transfer film surface by SEM-EDX measurement is 0.6 mass % or lower (preferably 0.3 mass % or lower, more preferably 0.1 mass % or lower, and even more preferably 500 mass ppm or lower).

[Addendum 10] The sliding member according to addendum 9, in which the carbon transfer film contains a component derived from the substrate.

[Addendum 11] The sliding member according to addendum 9 or 10, in which the carbon transfer film is the carbon transfer film described in any of addenda 1 to 8.

[Addendum 12] A lubricant composition containing:

an organic dispersion medium as a lubricant base, and nanodiamond particles nanodispersed in the organic dispersion medium, in which a content ratio of zirconia is lower than 100 mass ppm (preferably 20 mass ppm or lower and more preferably 2 mass ppm or lower).

[Addendum 13] The lubricant composition according to addendum 12, in which the nanodiamond particles are surface-modified nanodiamond particles that are surface-modified with a group represented by Formula (1):

where in Formula (1), X represents —NH—, —O—, —O—C(=O)—, —C(=O)—O—, —NH—C(=O)—, —C(=O)—NH—, or —S—, and the bond extending left from X is bonded to a nanodiamond particle; $R^1$ represents a monovalent organic group, and an atom bonded to X is a carbon atom; and in Formula (1), a molar ratio of carbon atoms to a total amount of heteroatoms selected from the group consisting of nitrogen atoms, oxygen atoms, sulfur atoms, and silicon atoms is 4.5 or higher.

[Addendum 14] A lubricant composition containing:

an organic dispersion medium as a lubricant base, and surface-modified nanodiamond particles nanodispersed in the organic dispersion medium, the surface-modified nanodiamond particles being surface-modified with a group represented by Formula (1):

where in Formula (1), X represents —NH—, —O—, —O—C(=O)—, —C(=O)—O—, —NH—C(=O)—, —C(=O)—NH—, or —S—; a bond extending left from X is bonded to a nanodiamond particle; $R^1$ represents a monovalent organic group, and an atom bonded to X is a carbon atom; and in Formula (1), a molar ratio of carbon atoms to a total amount of heteroatoms selected from the group consisting of nitrogen atoms, oxygen atoms, sulfur atoms, and silicon atoms is 4.5 or higher.

[Addendum 15] The lubricant composition according to addendum 13 or 14, in which the $R^1$ is a monovalent organic group having no hydroxy group, carboxy group, amino group, mono-substituted amino group, terminal alkenyl group, or terminal epoxy group.

[Addendum 16] The lubricant composition according to addendum 15, in which the monovalent organic group is a monovalent substituted or unsubstituted hydrocarbon group, a group in which a monovalent substituted or unsubstituted hydrocarbon group is bonded to an alkoxy group, or a group in which a monovalent substituted or unsubstituted hydrocarbon group is bonded to a dialkylamino group.

[Addendum 17] The lubricant composition according to any one of addenda 13 to 16, in which X is —O—, —O—C(=O)—, —C(=O)—O—, or —NH—.

[Addendum 18] The lubricant composition according to any one of addenda 13 to 17, in which X is —O—, —O—C(=O)—, or —C(=O)—O—, and $R^1$ is a monovalent substituted or unsubstituted hydrocarbon group (in particular, a monovalent substituted or unsubstituted hydrocarbon group having no hydroxy group, carboxy group, amino group, mono-substituted amino group, terminal alkenyl group, or terminal epoxy group) (more preferably a linear or branched hydrocarbon group having from 8 to 20 carbons (in particular, a linear or branched hydrocarbon group having from 8 to 20 carbons and having no terminal alkenyl group)).

[Addendum 19] The lubricant composition according to any one of addenda 13 to 17, in which X is —NH—, and $R^1$ is a monovalent organic group containing from 8 to 20 carbon atoms (in particular, a monovalent organic group containing from 8 to 20 carbon atoms and having no hydroxy group, carboxy group, amino group, mono-substituted amino group, terminal alkenyl group, or terminal epoxy group).

[Addendum 20] The lubricant composition according to any one of addenda 13 to 19, in which X is —NH—, and $R^1$ is a monovalent organic group containing a hydrocarbon group having 4 or more continuous carbon atoms in a linear chain (in particular, a monovalent organic group containing a hydrocarbon group having 4 or more continuous carbon atoms in a linear chain and having no hydroxy group, carboxy group, amino group, mono-substituted amino group, terminal alkenyl group, or terminal epoxy group).

[Addendum 21] The lubricant composition according to any one of addenda 13 to 20, in which a mass ratio of ND to a group represented by Formula (1) below [ND/the surface-modifying group] in the surface-modified nanodiamond particles is 0.5 or higher (preferably 2.5 or higher).

[Addendum 22] The lubricant composition according to addendum 21, in which the mass ratio is 15.0 or lower (preferably 10.0 or lower, more preferably 7.0 or lower, and even more preferably 5.0 or lower).

[Addendum 23] The lubricant composition according to any one of addenda 13 to 22, in which a content ratio of the surface-modified nanodiamond particles is from 0.01 to 5.0 mass % (preferably from 0.1 to 4.0 mass %, more preferably from 0.25 to 3.0 mass %, and even more preferably from 0.5 to 2.0 mass %) relative to a total amount of the lubricant composition.

[Addendum 24] The lubricant composition according to addendum 23, in which an average dispersed particle size (D50) of the surface-modified nanodiamond particles is from 2 to 50 nm (preferably from 4 to 30 nm, more preferably from 6 to 25 nm, and even more preferably from 10 to 20 nm).

[Addendum 25] The lubricant composition according to any one of addenda 13 to 22, in which a content ratio of the surface-modified nanodiamond particles is from 0.1 to 2000 mass ppm (preferably from 0.2 to 1000 mass ppm, more preferably from 0.5 to 500 mass ppm, and even more preferably from 1.0 to 100 mass ppm) relative to a total amount of the lubricant composition.

[Addendum 26] The lubricant composition according to addendum 25, in which an average dispersed particle size (D50) of the surface-modified nanodiamond particles is from 5 to 100 nm (preferably from 8 to 80 nm, more preferably from 10 to 60 nm, even more preferably from 15 to 40 nm, and particularly preferably from 18 to 35 nm).

[Addendum 27] The lubricant composition according to any one of addenda 13 to 26, in which a content ratio of a solvent is from 90 to 99.9999 mass %.

[Addendum 28] The lubricant composition according to any one of addenda 13 to 27, in which a content ratio of an organic dispersion medium as a lubricant base in a total amount of a solvent is 60 mass % or higher (preferably 70 mass % or higher, more preferably 80 mass % or higher, and even more preferably 90 mass % or higher).

[Addendum 29] The lubricant composition according to any one of addenda 13 to 28, in which a haze value is 5 or lower (preferably 3 or lower and more preferably 1 or lower).

[Appendix 30] The lubricant composition according to any one of addenda 13 to 29, in which a total content ratio of the surface-modified nanodiamond particles and the lubricant base is 70 mass % or higher (preferably 80 mass % or higher, more preferably 90 mass % or higher, even more preferably 95 mass % or higher, and particularly preferably 99 mass % or higher) relative to a total amount of the lubricant composition.

[Addendum 31] The lubricant composition according to any one of addenda 13 to 30, in which an organic dispersion medium as a lubricant base is one or more selected from the group consisting of a polyol ester, a poly(α-olefin), a mineral oil, an alkylbenzene, and a polyalkylene glycol.

[Addendum 31] A method of manufacturing a sliding member having a substrate and a carbon transfer film provided on a surface of the substrate, the method including: relatively sliding a sliding surface of the substrate and a sliding surface of a member for sliding in the presence of the lubricant composition described in any one of addenda 13 to 30 to transfer carbon derived from the nanodiamond particles in the lubricant composition onto the substrate to form the carbon transfer film.

[Addendum 32] The method of manufacturing a sliding member according to addendum 31, in which, further, a component in the substrate is transferred onto the substrate by the sliding to form the carbon transfer film.

[Addendum 33] The method of manufacturing a sliding member according to addendum 31 or 32, in which the member for sliding is a metal material.

[Addendum 34] The method of manufacturing a sliding member according to any one of addenda 31 to 33, in which the sliding is performed under boundary lubrication conditions.

[Addendum 35] A piston having the carbon transfer film described in any one of addenda 1 to 8 in a sliding region relative to a cylinder.

[Addendum 36] A cylinder having the carbon transfer film described in any one of addenda 1 to 8 in a sliding region relative to a piston.

REFERENCE SIGNS LIST

1 Sliding member
11 Substrate
12 Carbon transfer film
13 Lubricant composition
14 Member for sliding

The invention claimed is:

1. A carbon transfer film comprising $sp^2$-bonded carbon and $sp^3$-bonded carbon, wherein a ratio of the $sp^3$-bonded carbon to a sum of the $sp^2$-bonded carbon and the $sp^3$-bonded carbon, $sp^3/(sp^2+sp^3)$, is from 0.01 to 0.2, and
a ratio of zirconium calculated from elemental analysis of a surface by SEM-EDX measurement is 0.6 mass % or lower, and a thickness is less than 100 nm.

2. The carbon transfer film according to claim 1, wherein the $sp^3$-bonded carbon is carbon derived from diamond.

3. The carbon transfer film according to claim 1, wherein the $sp^2$-bonded carbon is carbon derived from diamond.

4. A sliding member comprising:
a substrate, and
a carbon transfer film provided on at least one surface of the substrate,
wherein the carbon transfer film comprises $sp^2$-bonded carbon and $sp^3$-bonded carbon, and has a thickness of less than 100 nm,
a ratio of the $sp^3$-bonded carbon to a sum of the $sp^2$-bonded carbon and the $sp^3$-bonded carbon, $sp^3/(sp^2+sp^3)$, is from 0.01 to 0.2, and
a ratio of zirconium calculated from elemental analysis of the carbon transfer film surface by SEM-EDX measurement is 0.6 mass % or lower.

5. The sliding member according to claim 4, wherein the carbon transfer film comprises a component derived from the substrate.

6. A lubricant composition comprising:
an organic dispersion medium as a lubricant base, and
nanodiamond particles nanodispersed in the organic dispersion medium,
wherein a content ratio of zirconia is lower than 100 mass ppm, and
the nanodiamond particles are surface-modified nanodiamond particles that are surface-modified with a group represented by Formula (1):

—X—R¹     (1)

where in Formula (1), X represents —NH—, —O—, —O—C(=O)—, —C(=O)—O—, —NH—C(=O)—, —C(=O)—NH—, or —S—; and a bond extending left from X is bonded to a nanodiamond particle; $R^1$ represents a monovalent organic group, and an atom bonded to X is a carbon atom; and in Formula (1), a molar ratio of carbon atoms to a total amount of heteroatoms selected from the group consisting of nitrogen atoms, oxygen atoms, sulfur atoms, and silicon atoms is 4.5 or higher.

7. A lubricant composition comprising:
an organic dispersion medium as a lubricant base, and
surface-modified nanodiamond particles nanodispersed in the organic dispersion medium, the surface-modified nanodiamond particles being surface-modified with a group represented by Formula (1):

—X—R¹     (1)

where in Formula (1), X represents —NH—, —O—, —O—C(=O)—, —C(=O)—O—, —NH—C(=O)—, —C(=O)—NH—, or —S—; a bond extending left from X is bonded to a nanodiamond particle; le represents a monovalent organic group, and an atom bonded to X is a carbon atom; and in Formula (1), a molar ratio of carbon atoms to a total amount of heteroatoms selected from the group consisting of nitrogen atoms, oxygen atoms, sulfur atoms, and silicon atoms is 4.5 or higher.

8. The lubricant composition according to claim 6, wherein the $R^1$ is a monovalent organic group comprising no hydroxy group, carboxy group, amino group, mono-substituted amino group, terminal alkenyl group, or terminal epoxy group.

9. The lubricant composition according to claim 6, wherein the organic dispersion medium as a lubricant base is one or more selected from the group consisting of a polyol ester, a poly(α-olefin), a mineral oil, an alkylbenzene, and a polyalkylene glycol.

10. The lubricant composition according to claim 6, wherein a content ratio of the nanodiamond particles is from 0.01 to 5.0 mass %, and an average dispersed particle size of the nanodiamond particles in the lubricant composition is from 2 to 50 nm.

11. The lubricant composition according to claim 6, wherein a content ratio of the nanodiamond particles is from 0.1 to 2000 mass ppm, and an average dispersed particle size of the nanodiamond particles in the lubricant composition is from 5 to 100 nm.

12. A method of manufacturing a sliding member comprising a substrate and a carbon transfer film provided on a surface of the substrate, the method comprising:
relatively sliding a sliding surface of the substrate and a sliding surface of a member for sliding in the presence of the lubricant composition described in claim 6 to transfer carbon derived from the nanodiamond particles in the lubricant composition onto the substrate to form the carbon transfer film.

13. The method of manufacturing a sliding member according to claim 12, wherein, further, a component in the substrate is transferred onto the substrate by the sliding to form the carbon transfer film.

14. The method of manufacturing a sliding member according to claim 12, wherein the member for sliding is a metal material.

15. The method of manufacturing a sliding member according to claim 14, wherein the sliding is performed under boundary lubrication conditions.

16. A piston comprising the carbon transfer film described in claim 1 in a sliding region relative to a cylinder.

17. A cylinder comprising the carbon transfer film described in claim 1 in a sliding region relative to a piston.

* * * * *